United States Patent
Muramatsu

(10) Patent No.: US 9,152,887 B2
(45) Date of Patent: Oct. 6, 2015

(54) OBJECT DETECTION DEVICE, OBJECT DETECTION METHOD, AND OBJECT DETECTION PROGRAM

(71) Applicant: Panasonic Corporation, Osaka (JP)

(72) Inventor: Hirokazu Muramatsu, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 399 days.

(21) Appl. No.: 13/672,002

(22) Filed: Nov. 8, 2012

(65) Prior Publication Data

US 2013/0070096 A1    Mar. 21, 2013

Related U.S. Application Data

(63) Continuation of application No. PCT/JP2012/002375, filed on Apr. 5, 2012.

(30) Foreign Application Priority Data

Jun. 2, 2011    (JP) ................. 2011-124362

(51) Int. Cl.
*G06K 9/78* (2006.01)
*G06K 9/00* (2006.01)

(52) U.S. Cl.
CPC .............. *G06K 9/78* (2013.01); *G06K 9/00369* (2013.01); *G06K 9/00805* (2013.01)

(58) Field of Classification Search
CPC . A41J 31/402; B22D 11/0622; B22D 11/161; A61K 31/343; C07D 307/87; G06K 9/00369; G06K 9/00805; G06K 9/78
USPC ........................................................ 348/148
See application file for complete search history.

(56) References Cited

U.S. PATENT DOCUMENTS 6,434,254 B1 *  8/2002  Wixson ................... 382/103
6,593,960 B1 *  7/2003  Sugimoto et al. ........ 348/148

(Continued)

FOREIGN PATENT DOCUMENTS

JP    2001-052171 A    2/2001
JP    2007-265390 A    10/2007

(Continued)

OTHER PUBLICATIONS

International Search Report for Application No. PCT/JP2012/002375 dated Apr. 26, 2012.

*Primary Examiner* — Shan Elahi
(74) *Attorney, Agent, or Firm* — Pearne & Gordon LLP

(57) ABSTRACT

An object detection device (10) is provided with: a video image converting section (20) converting an input video image in which surroundings of a vehicle are shot, to a characteristics video image into which image characteristics have been extracted from the input video image; a video images-classified-by-distance extracting/composing section (30) extracting areas which differ according to distances from the characteristics video image on the basis of the distance from a vehicle and composing the areas; a first object detecting section (40) scanning a composite video image to perform first object detection processing; an object-candidate position specifying section (50) determining an object-candidate position from a result of the first object detection processing; a second object detecting section (60) performing second object detection processing for the object-candidate position; and an object position identifying section (70) identifying an object position from a result of the second object detecting section.

18 Claims, 18 Drawing Sheets

(56) References Cited

U.S. PATENT DOCUMENTS

| | | | |
|---|---|---|---|
| 6,757,009 B1* | 6/2004 | Simon et al. | 348/148 |
| 6,912,001 B2* | 6/2005 | Okamoto et al. | 348/222.1 |
| 8,670,034 B2* | 3/2014 | Hattori et al. | 348/148 |
| 8,885,045 B2* | 11/2014 | Yanagi | 348/148 |
| 2002/0149673 A1* | 10/2002 | Hirama et al. | 348/118 |
| 2003/0007074 A1* | 1/2003 | Nagaoka et al. | 348/148 |
| 2003/0137586 A1* | 7/2003 | Lewellen | 348/148 |
| 2003/0209893 A1* | 11/2003 | Breed et al. | 280/735 |
| 2004/0129478 A1* | 7/2004 | Breed et al. | 180/273 |
| 2005/0264433 A1* | 12/2005 | Yokokohji et al. | 340/937 |
| 2006/0197761 A1* | 9/2006 | Suzuki et al. | 345/427 |
| 2006/0251293 A1* | 11/2006 | Piirainen et al. | 382/104 |
| 2007/0201747 A1 | 8/2007 | Yamada et al. | |
| 2007/0274566 A1 | 11/2007 | Fujimoto | |
| 2008/0089557 A1* | 4/2008 | Iwaki et al. | 382/106 |
| 2008/0266396 A1* | 10/2008 | Stein | 348/148 |
| 2008/0309763 A1* | 12/2008 | Hongo | 348/148 |
| 2009/0022368 A1* | 1/2009 | Matsuoka et al. | 382/103 |
| 2009/0046151 A1* | 2/2009 | Nagaoka et al. | 348/148 |
| 2009/0066726 A1* | 3/2009 | Kato et al. | 345/639 |
| 2010/0079590 A1* | 4/2010 | Kuehnle et al. | 348/118 |
| 2011/0050886 A1* | 3/2011 | Thompson et al. | 348/135 |
| 2011/0262045 A1* | 10/2011 | Ichikawa | 382/218 |
| 2012/0154591 A1* | 6/2012 | Baur et al. | 348/148 |
| 2012/0155769 A1 | 6/2012 | Yokomitsu et al. | |
| 2013/0314503 A1* | 11/2013 | Nix et al. | 348/46 |

FOREIGN PATENT DOCUMENTS

| | | |
|---|---|---|
| JP | 2007-272555 A | 10/2007 |
| JP | 2007-316790 A | 12/2007 |
| JP | 2011-055366 A | 3/2011 |

\* cited by examiner

FIG. 10
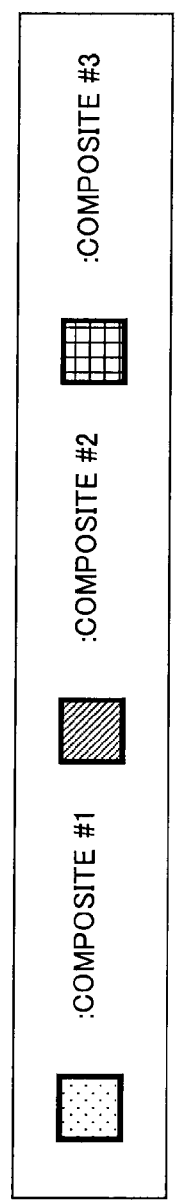
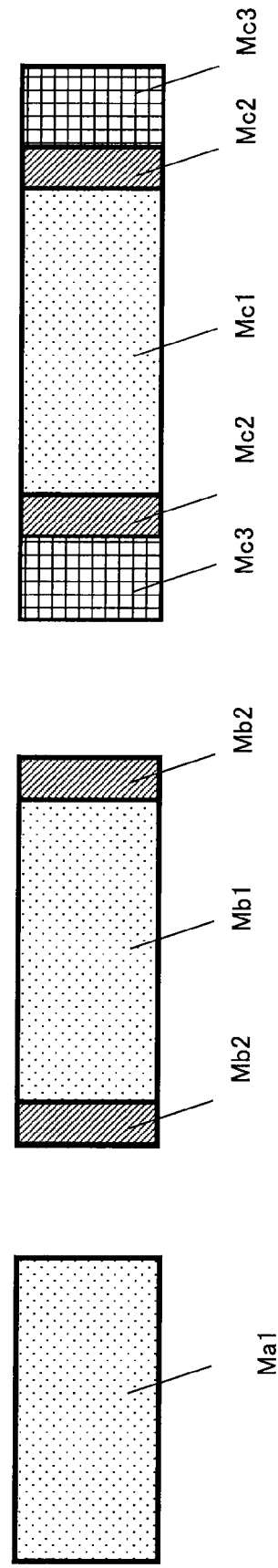
(a) Am VIDEO IMAGE
(b) Bm VIDEO IMAGE
(c) Cm VIDEO IMAGE FIG. 11
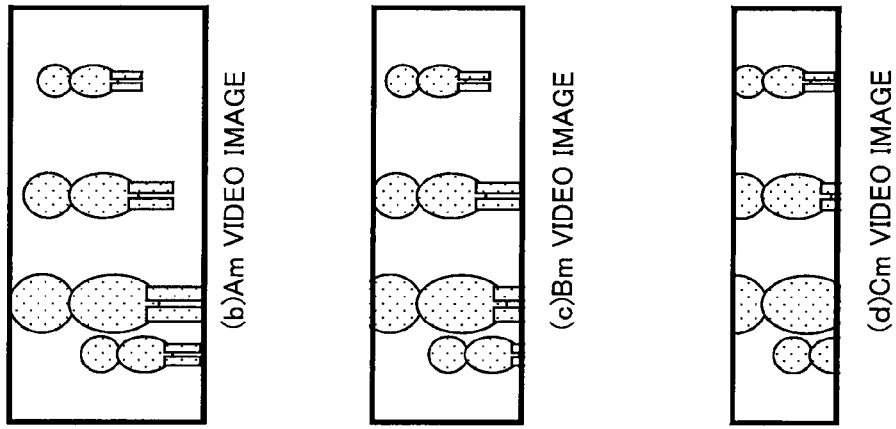
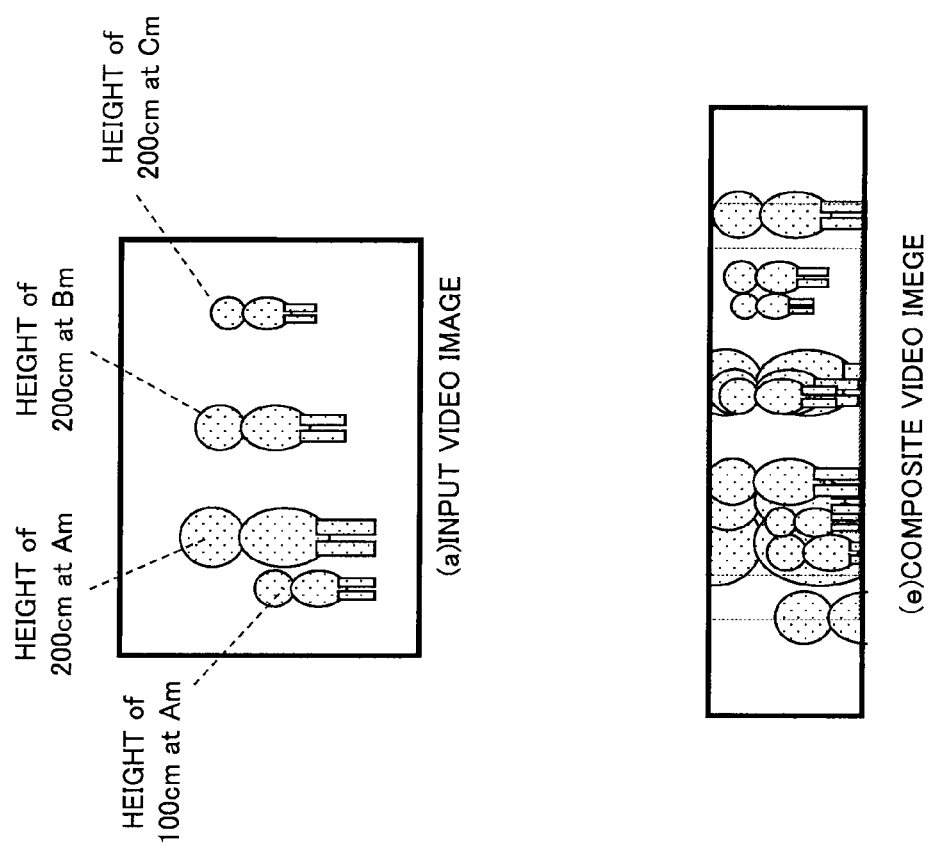

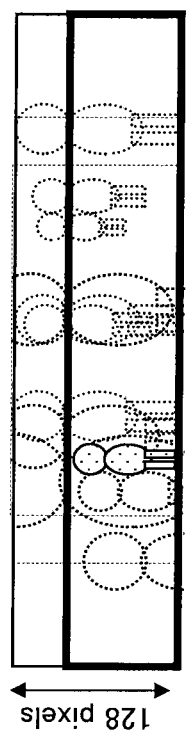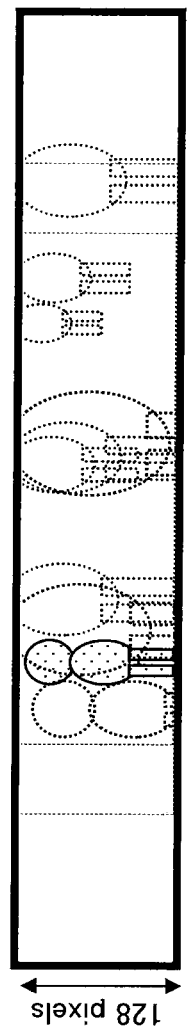
FIG. 13
(a) CUT-OUT AREA WITH HEIGHT OF 100 CM AS TARGET
(b) CUT-OUT AND ENLARGED COMPOSITE VIDEO IMAGE

OBJECT DETECTION DEVICE, OBJECT DETECTION METHOD, AND OBJECT DETECTION PROGRAM

TECHNICAL FIELD

The present invention relates to an object detection device, an object detection method and an object detection program, and in particular to an object detection device capable of detecting an object, such as a pedestrian, existing around a vehicle, an object detection method and an object detection program.

BACKGROUND ART

Recently, onboard cameras have become common for the purpose of supporting safe driving of an automobile. For example, an onboard camera (image capture apparatus) is installed at a front or rear part of a vehicle to shoot a video image of surroundings of the vehicle. The shot video image is displayed on a display installed before a driver's seat. Thereby, a driver can confirm existence or nonexistence of an object, such as a pedestrian, existing around the vehicle when the vehicle is running.

Efforts are also being made for attracting a driver's attention not by simply displaying a video image of surroundings of a vehicle on a display but by detecting an object, such as a pedestrian, in advance by some means, and displaying a video image with detection result information added thereto or issuing a warning by voice.

As the means for detecting an object, such as a pedestrian, for example, such that is mounted with a sensor for sensing a heat source or distance, separately from an onboard camera has been the mainstream of the means. However, mounting of a separate sensor is disadvantageous from the viewpoint of cost and versatility, and it is desired that image recognizing means for detecting an object only by a video image of an onboard camera is put to practical use.

In the field of research, a method of using edge characteristics in a video image has been considered to be effective as a method for detecting an object by image recognition. A boosting method has been established in which a great number of video images of a detection target object is learned in advance and utilized as statistical data. In the field of research, an object detection method obtained by composing the method using edge characteristics and the boosting method has already reached to a practical level from the viewpoint of detection accuracy.

From the viewpoint of practical use, however, the above method for detecting an object by image recognition has a problem of processing time. In the case of image recognition, video image processing is complicated, and it is required to scan the whole video image. Therefore, it takes much time until an object detection result for one frame of video image is obtained. Therefore, there are a problem that the frame rate of object detection processing is lower than the frame rate of a camera, and a problem that delay time before obtaining an object detection result for a video image occurs.

To cope with such problems related to processing time, a technique of performing two-stage detection is disclosed according to an object detection device described in Patent Literature 1 in which a reduced image obtained by reducing an inputted image is created, existence or nonexistence of an object is roughly detected on the reduced image first, and then detection processing is performed again for the input image with the original size only when an object is detected on the reduced image. Thereby, scanning is performed substantially with the size of the reduced image, the detection processing can be sped up.

In the method described in Patent Literature 1, however, since detection processing is performed with the use of a reduced image, image characteristics used in object detection processing are lost by the reduction. Therefore, there is a problem that, especially when an image of an object detection target is originally captured in a small size on a video image, detection performance cannot be sufficiently obtained. As a factor of an image of an object detection target being captured in a small size, any one of a factor that a detection target object is originally small and a factor that a detection target object exists at a position at a long distance from a camera is conceivable, or both of the factors are conceivable. At this time, there are caused bad effects: in the former case, a bad effect that sufficient detection accuracy cannot be obtained depending on a detection target object, and, in the latter case, a bad effect that the range of the distance to a detectable object is shortened.

CITATION LIST

Patent Literature

[Patent Literature 1] Japanese Patent Laid-Open No. 2007-265390

SUMMARY OF INVENTION

Technical Problem

The present invention has been made under the background described above. The object of the present invention is to provide an object detection device capable of speeding up detection processing time while performing object detection only by image recognition, without sacrificing detection performance, a method and a program.

Solution to Problem

An aspect of the present invention is an object detection device detecting an object near a vehicle from an input video image, the input video image being a video image of surroundings of the vehicle shot from the vehicle. This object detection device is provided with: a video image converting section converting the input video image to a characteristics video image into which image characteristics have been extracted from the input video image; a video images-classified-by-distance extracting/composing section extracting areas which differ according to distances from the characteristics video image as video images classified by distance, on the basis of the distance from the vehicle, and composing a composite video image using the video images classified by distance; a first object detecting section performing first object detection processing of scanning the composite video image composed by the video images-classified-by-distance extracting/composing section to determine a position on the composite video image of an object detected from the composite video image; an object-candidate position specifying section determining an object-candidate position where there is a possibility of existence of the object, in the video images classified by distance, on the basis of the position on the composite video image of the object detected by the first object detecting section; a second object detecting section performing, for the object-candidate position determined by the object-candidate position specifying section, second object detection processing for identifying corresponding object positions in the video images classified by distance; and an object position identifying section identifying an object position in the input video image on the basis of the object positions determined by the second object detecting section.

Another aspect of the present invention is an object detection method for detecting an object near a vehicle from an input video image, the input video image being a video image of surroundings of the vehicle shot from the vehicle. This object detection method includes: a video image converting step of converting the input video image to a characteristics video image into which image characteristics have been extracted from the input video image; a video images-classified-by-distance extracting/composing step of extracting areas which differ according to distances from the characteristics video image as video images classified by distance, on the basis of the distance from the vehicle, and composing a composite video image using the video images classified by distance; a first object detecting step of performing first object detection processing of scanning the composite video image composed in the video images-classified-by-distance extracting/composing step to determine a position on the composite video image of an object detected from the composite video image; an object-candidate position detecting step of determining an object-candidate position where there is a possibility of existence of the object, in the video images classified by distance, on the basis of the position on the composite video image of the object detected in the first object detecting step; a second object detecting step of performing, for the object-candidate position determined in the object-candidate position detecting step, second object detection processing for identifying corresponding object positions in the video images classified by distance; and an object position identifying step of identifying an object position in the input video image on the basis of the object positions determined in the second object detecting step.

Another aspect of the present invention is an object detection program for detecting an object near a vehicle from an input video image, the input video image being a video image of surroundings of the vehicle shot from the vehicle. This program causes a computer to realize: a video image converting function of converting the input video image to a characteristics video image into which image characteristics have been extracted from the input video image; a video images-classified-by-distance extracting/composing function of extracting areas which differ according to distances from the characteristics video image as video images classified by distance, on the basis of the distance from the vehicle, and composing the video images classified by distance; a first object detecting function of scanning the composite image composed by the video images-classified-by-distance extracting/composing function to perform first object detection processing; an object-candidate position detecting function of determining an object-candidate position where there is a possibility of existence of an object, in the video images classified by distance, on the basis of a position on the composite video image where an object has been detected by the first object detecting section; a second object detecting function of performing second object detection processing for the object-candidate position determined by the object-candidate position detecting function to identify an object position in the video images classified by distance; and an object position identifying function of identifying an object position in the input video image on the basis of the object positions determined by the second object detecting function.

There are other aspects of the present invention as described below. Therefore, disclosure of the present invention is intended to provide a part of aspects of the present invention and is not intended to limit the scope of the invention described and claimed herein.

BRIEF DESCRIPTION OF DRAWINGS

FIG. 10(a) is a diagram showing an example of a composite coefficient of the A m video image; FIG. 10(b) is a diagram showing an example of composite coefficients of the B m video image; and FIG. 10(c) is a diagram showing an example of composite coefficients of the C m video image.

FIG. 11(a) is a diagram showing an example of an input video image; FIG. 11(b) is a diagram showing an example of the A m video image; FIG. 11(c) is a diagram showing an example of the B m video image; FIG. 11(d) is a diagram showing an example of the C m video image; and FIG. 11(e) is a diagram showing an example of composite video image.

FIG. 13(a) is an explanatory diagram showing an example of cutout from the composite video image, with the height of 100 cm as a target; and FIG. 13(b) is an explanatory diagram showing an example of enlarging the cut-out composite video image.

DESCRIPTION OF EMBODIMENT

Figure 1:
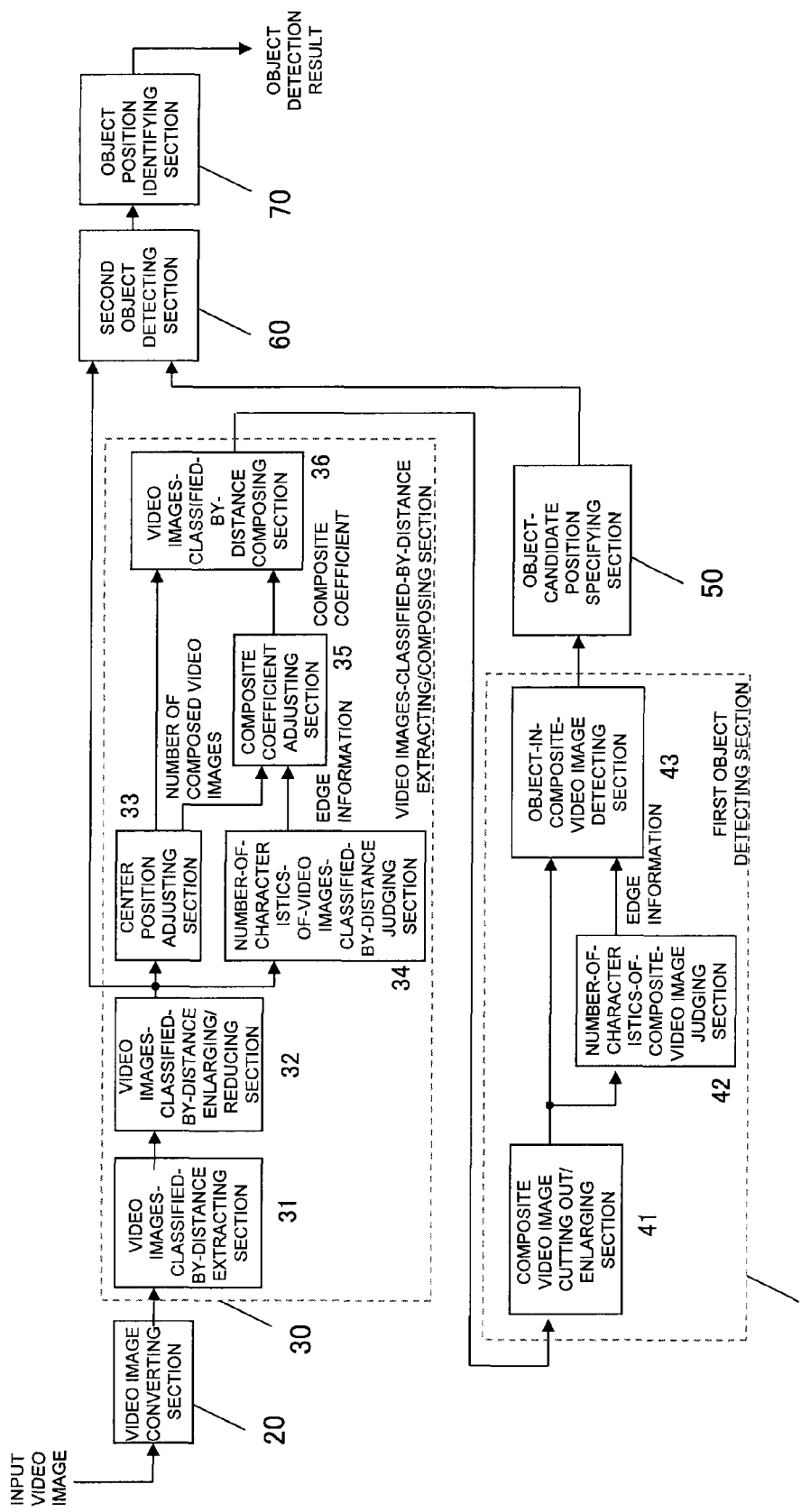
FIG. 1 is a block diagram showing a configuration of an object detection device according to an embodiment of the present invention.

The present invention will be described below in detail. However, the following detailed description and accompanying drawings are not intended to limit the invention thereto.

The object detection device of the present invention is an object detection device detecting an object near a vehicle from an input video image, the input video image being a video image of surroundings of the vehicle shot from the vehicle. The device is configured to be provided with: a video image converting section converting the input video image to a characteristics video image into which image characteristics have been extracted from the input video image; a video images-classified-by-distance extracting/composing section extracting areas which differ according to distances from the characteristics video image as video images classified by distance, on the basis of the distance from the vehicle, and composing a composite video image using the video images classified by distance; a first object detecting section performing first object detection processing of scanning the composite video image composed by the video images-classified-by-distance extracting/composing section to determine a position on the composite video image of an object detected from the composite video image; an object-candidate position specifying section determining an object-candidate position where there is a possibility of existence of the object, in the video images classified by distance, on the basis of the position on the composite video image of the object detected by the first object detecting section; a second object detecting section performing, for the object-candidate position determined by the object-candidate position specifying section, second object detection processing for identifying corresponding object positions in the video images classified by distance; and an object position identifying section identifying an object position in the input video image on the basis of the object positions determined by the second object detecting section.

According to this configuration, since the image characteristics of an input video image are not damaged, it is possible to provide an object detection device capable of speeding up detection processing time without sacrificing detection performance.

In the object detection device of the present invention, it is preferable that the video image converting section extracts edge characteristics as image characteristics. According to this configuration, it is possible to convert an input video image to a video image in which only edge characteristics used for object detection processing are left.

In the object detection device of the present invention, it is preferable that the video images-classified-by-distance extracting/composing section changes the size of an area extracted from a characteristics video image on the basis of the distance from a vehicle. By this configuration, it is possible to perform object detection correspondingly to the size of a detected target object the image of which is captured in a different size on a video image according to the distance from the vehicle.

In the object detection device of the present invention, it is preferable that the video images-classified-by-distance extracting/composing section enlarges/reduces video images extracted according to distances so that the vertical sizes of all the video images classified by distance are equal to one another. By this configuration, it is possible to equalize the sizes of detection target objects the image of which are captured in different sizes on a video image according to the distances from the vehicle, and, therefore, the object detection processing is simplified.

In the object detection device of the present invention, it is preferable that the video images-classified-by-distance extracting/composing section composes video images classified by distance, adjusting the positions of the horizontal and vertical axes of the video images classified by distance so that they are overlapped. By this configuration, the center position of a composite video image is the same position on all the video images classified by distance, and, therefore, it becomes easy to grasp the position of a detected object. Furthermore, since the size of the composite video image is smaller than the total size of all the video images classified by distance, the object detection processing can be sped up.

In the object detection device of the present invention, it is preferable that the video images-classified-by-distance extracting/composing section composes video images classified by distance by α blending. By this configuration, it is possible to adjust the degree of influence of each video image classified by distance on a composite video image by adjusting a composite coefficient.

In the object detection device of the present invention, it is preferable that the video images-classified-by-distance extracting/composing section composes video images classified by distance, adjusting a composite coefficient of the α blending for parts of the composed video images classified by distance according to the number of composed video images classified by distance. By this configuration, it is possible to, when the number of video images classified by distance composed on a composite video image differs on parts of the composite video image, create a state in which optimum image characteristics are held for each of the parts when the composite video image is obtained.

In the object detection device of the present invention, it is preferable that the video images-classified-by-distance extracting/composing section composes the video images classified by distance, adjusting the composite coefficient of the α blending according to the numbers of image characteristics included in video images classified by distance. By this configuration, it is possible to, by increasing the composite coefficient of a video image classified by distance which includes a lot of image characteristics, create a state in which optimum image characteristics are held when the composite video image is obtained.

In the object detection device of the present invention, it is preferable that the vertical size of a detection target object in the object detection processing by the first object detecting section is equal to the vertical size of a composite video image. By this configuration, it is possible to simplify object detection scanning in the detection target processing.

In the object detection device of the present invention, it is preferable that the first object detecting section performs the object detection processing by performing scanning on a composite video image only in a horizontal detection. By this configuration, the number of scans for object detection can be reduced, and, therefore, the object detection processing can be sped up.

In the object detection device of the present invention, it is preferable that the first object detecting section is provided with a composite video image cutting out/enlarging section cutting out an area in contact with the bottom end of a composite video image and generating an enlarged composite video image obtained by enlarging the vertical size of the cut-out area so that the vertical size is equal to the vertical size of the composite video image. By this configuration, it is possible to use the assumption that the bottom end of an object is necessarily in contact with the bottom end of a composite video image at the time of coping with difference in size among detection target objects (for example, difference in height among pedestrians), and, therefore, such an area on a video image that an object cannot exist is not targeted by scanning. Thus, it is possible to speed up the object detection processing. Furthermore, since the size of the cut-out composite video image is adjusted to be the same as the size of the composite video image before the cutout, there is a merit that it is not necessary to consider the size of a detection target object on a video image for the object detection processing.

In the object detection device of the present invention, it is preferable that the first object detecting section performs the object detection processing for the enlarged composite video image. By this configuration, it is possible to cope with difference in size among detection target objects (for example, difference in height among pedestrians).

In the object detection device of the present invention, it is preferable that the first object detecting section performs the object detection processing by performing scanning on the enlarged composite video image only in a horizontal detection. By this configuration, the number of scans for object detection can be reduced, and, therefore, the object detection processing can be sped up.

In the object detection device of the present invention, it is preferable that the first object detecting section is capable of adjusting a detection judgment criterion for object detection separately from the second object detecting section, and the detection criterion is adjusted so that the first object detecting section judges an object to be an object more easily than the second object detecting section. By this configuration, it is possible for the first object detecting section to perform rough detection, that is, easily perform detection to prevent detection omission on a composite video image, and for the second object detection section to strictly judge that a detected object exists to prevent wrong detection.

In the object detection device of the present invention, it is preferable that the first object detecting section performs first object detection processing only on parts of a composite video image where the image characteristics exist as targets. By this configuration, scanning of a position where a detected object cannot exist does not happen, and, therefore, detection processing is sped up.

In the object detection device of the present invention, it is preferable that the object position identifying section determines the distance from a vehicle to a detected object on the basis of object positions on video images classified by distance detected by the second object detecting section. By this configuration, at the same time that existence or nonexistence of a detection target object is detected, information about the distance to the object is obtained, and it is useful for warning and the like based on a detection result.

The object detection method of the present invention is an object detection method for detecting an object near a vehicle from an input video image, the input video image being a video image of surroundings of the vehicle shot from the vehicle, the method including: a video image converting step of converting the input video image to a characteristics video image into which image characteristics have been extracted from the input video image; a video images-classified-by-distance extracting/composing step of extracting areas which differ according to distances from the characteristics video image as video images classified by distance, on the basis of the distance from the vehicle, and composing a composite video image using the video images classified by distance; a first object detecting step of performing first object detection processing of scanning the composite video image composed in the video images-classified-by-distance extracting/composing step to determine a position on the composite video image of an object detected from the composite video image; an object-candidate position detecting step of determining an object-candidate position where there is a possibility of existence of the object, in the video images classified by distance, on the basis of the position on the composite video image of the object detected in the first object detecting step; a second object detecting step of performing, for the object-candidate position determined in the object-candidate position detecting step, second object detection processing for identifying corresponding object positions in the video images classified by distance; and an object position identifying step of identifying an object position in the input video image on the basis of the object positions determined in the second object detecting step. By this method also, advantages similar to those of the device described above can be obtained.

The object detection program of the present invention is an object detection program for detecting an object near a vehicle from an input video image, the input video image being a video image of surroundings of the vehicle shot from the vehicle. The program is for causing a computer to realize: a video image converting function of converting the input video image to a characteristics video image into which image characteristics have been extracted from the input video image; a video images-classified-by-distance extracting/composing function of extracting areas which differ according to distances from the characteristics video image as video images classified by distance, on the basis of the distance from the vehicle, and composing the video images classified by distance; a first object detecting function of scanning the composite image composed by the video images-classified-by-distance extracting/composing function to perform first object detection processing; an object-candidate position detecting function of determining an object-candidate position where there is a possibility of existence of an object, in the video images classified by distance, on the basis of a position on the composite video image where an object has been detected by the first object detecting section; a second object detecting function of performing second object detection processing for the object-candidate position determined by the object-candidate position detecting function to identify an object position in the video images classified by distance; and an object position identifying function of identifying an object position in the input video image on the basis of the object position determined by the second object detecting function. By this program also, advantages similar to those of the device described above can be obtained.

According to the present invention, there are obtained excellent advantages that, since a video image can be reduced without damaging image characteristics of an input video image, detection processing time can be sped up without sacrificing detection performance, and that it is also possible to measure the distance from a vehicle to an object.

Embodiment

An object detection device according to an embodiment of the present invention will be described below with reference to drawings.

FIG. 1 is a block diagram showing a configuration of an object detection device according to an embodiment of the present invention. An object detection device 10 shown in FIG. 1 is provided with a video image converting section 20 which converts an input video image inputted from the outside to a characteristics video image into which image characteristics have been extracted from the input video image; a video images-classified-by-distance extracting/composing section 30 which, on the basis of distances from a vehicle, composes video images classified by distance which include different areas extracted from the characteristics video image according to the distances; a first object detecting section 40 which performs first object detection processing for an obtained composite video image; an object-candidate position specifying section 50 which determines an object-candidate position where there is a possibility of existence of an object, in the video images classified by distance, from a result of the first object detection processing, a second object detecting section 60 which performs second object detection processing for the object-candidate position in the video images classified by distance; and an object position identifying section 70 which identifies an object position on the input video image from a detection result of the second object detection section.

An input video image inputted from the outside is assumed to be a video image obtained by shooting the surroundings of a vehicle by an onboard camera attached, for example, at a predetermined position near a number plate on the front or rear side of the vehicle and with a predetermined angle.

The video image converting section 20 performs, on the basis of the input video image, video image conversion processing for extracting image characteristics on the video image. In the embodiment of the present invention, edge characteristics are extracted as the image characteristics, and processing paying attention to the edge characteristics is performed in subsequent-stage processing. However, the image characteristics targeted in the present invention are not limited to the edge characteristics. For example, in the case of the purpose of detecting traffic signs and signals on roads, it is effective to perform processing for extracting a particular color as an image characteristic. As concrete processing for extracting the edge characteristics, embossing or edge extraction by a Sobel filter are conceivable. However, the processing is not limited to these processes.

The video images-classified-by-distance extracting/composing section 30 is provided with a video images-classified-by-distance extracting section 31, a video images-classified-by-distance enlarging/reducing section 32, a center position adjusting section 33, a number-of-characteristics-of-video images-classified-by-distance judging section 34, a composite coefficient adjusting section 35 and a video images-classified-by-distance composing section 36. The video images-classified-by-distance extracting section 31 extracts an area where there is a possibility that an image of a detection target object may be captured on a video image when the detection target object exists at a position at predetermined distances from the vehicle, in different sizes according to the distances, from a characteristics video image. The video images-classified-by-distance enlarging/reducing section 32 enlarges or reduces a video image classified by distance corresponding to each distance which has been extracted by the video images-classified-by-distance extracting section 31 so that the vertical size of the video image classified by distance becomes a predetermined size. Thereby, the vertical sizes of all the video images classified by distance become equal to one another (the horizontal sizes are different from one another). In the description below, a video image classified by distance refers to the video image classified by distance enlarged or reduced by the video images-classified-by-distance enlarging/reducing section 32 unless otherwise specified. The center position adjusting section 33 adjusts the positions of the horizontal and vertical axes of the video images classified by distance resized by the video images-classified-by-distance enlarging/reducing section 32 so that the positions are overlapped, and determines the number of composed video images at a video image position. The number of composed video images means the number of overlapped video images classified by distance. The characteristics-of-video images-classified-by-distance judging section 34 determines the amount of image characteristics existing on each video image classified by distance. The composite coefficient adjusting section 35 determines a composite coefficient for each partial area of the video images classified by distance on the basis of the number of composed video images determined by the center position adjusting section 33 and the amount of image characteristics determined by the number-of-characteristics-of-video images-classified-by-distance judging section 34. The video images-classified-by-distance composing section 36 multiplies the video images classified by distance the center positions of which have been adjusted by the center position adjusting section 33 to be overlapped, by the composite coefficients determined by the composite coefficient adjusting section 35 to generate a composite video image in which all the video images classified by distance are composed. At this time, the number of the pixels of the composite video image is smaller than the sum total of the numbers of pixels of all the video images classified by distance.

The first object detecting section 40 is provided with a composite video image cutting out/enlarging section 41, a number-of-characteristics-of-composite-video image judging section 42 and an object-in-composite-video image detecting section 43. The composite video image cutting out/enlarging section 41 cuts out a part of the composite video image and enlarges the video image so that the vertical size of the cut-out composite video image is equal to the vertical size before the cutout. The purpose of this processing is to cope with difference in size among object detection targets (for example, difference in height among pedestrians). The number-of-characteristics-of-composite-video image judging section 42 identifies positions where image characteristics exist on the composite video image outputted from the composite video image cutting out/enlarging section 41. The object-in-composite-video image detecting section 43 performs object detection processing only for such positions where it is judged by the number-of-characteristics-of-composite-video image judging section 42 that image characteristics exist, as targets, on the composite video image outputted from the composite video image cutting out/enlarging section 41. By excluding positions where image characteristics do not exist, in advance, because a detection target object does not exist there, it is expected to speed up the object detection processing. In the description below, a composite image at the first object detecting section and subsequent-stage sections refers to the cut-out and enlarged composite image unless otherwise specified.

The object-candidate position specifying section 50 determines where on the video images classified by distance a detection position at which an object has been detected by the first object detecting section 40 is located. For example, if one object is detected on the composite video image when the composite video image is composed of two video images classified by distance, a total of two object-candidate positions exist because there is one position where there is a possibility of existence of an object, on each of the video images classified by distance.

The second object detecting section 60 performs object detection only for the candidate positions on the video images classified by distance specified by the object-candidate position specifying section 50 to identify object positions existing on the video images classified by distance.

The object position identifying section 70 calculates an object position on the input video image on the basis of a detection result of the second object detecting section 60, and outputs the object position as well as the distance from the vehicle to the object, as a final result.

The configuration and process flow of an object detection device according to an embodiment of the present invention has been described above.

Next, a series of processes by the video images-classified-by-distance extracting/composing section 30, the first object detecting section 40, the object-candidate position specifying section 50, the second object detecting section 60 and the object position identifying section 70 will be described in detail with reference to drawings. Hereinafter, numerical values for description will be set as shown below for concretization of the description. An input image is assumed to have 640 pixels horizontally and 480 pixels vertically. The vertical sizes of video images classified by distance outputted from the video images-classified-by-distance enlarging/reducing section 32 and a composite video image outputted from the composite video image cutting out/enlarging section 41 are assumed to be 128 pixels. The size of a scanning frame used at the time of performing target object detection processing by the first object detecting section and the second object detection section is assumed to be 64 pixels horizontally and 128 pixels vertically. Detection target objects are assumed to be pedestrians existing on a road surface, and the heights of the detection target pedestrians are assumed to be 100 to 200 cm. Pedestrians existing at three points at distances of A meters, B meters and C meters from a vehicle are to be detection targets. The examples given here are only for the purpose of description, and this embodiment is not limited thereto.

First, the video images-classified-by-distance extracting/composing section 30 will be described in detail.

Figure 2:
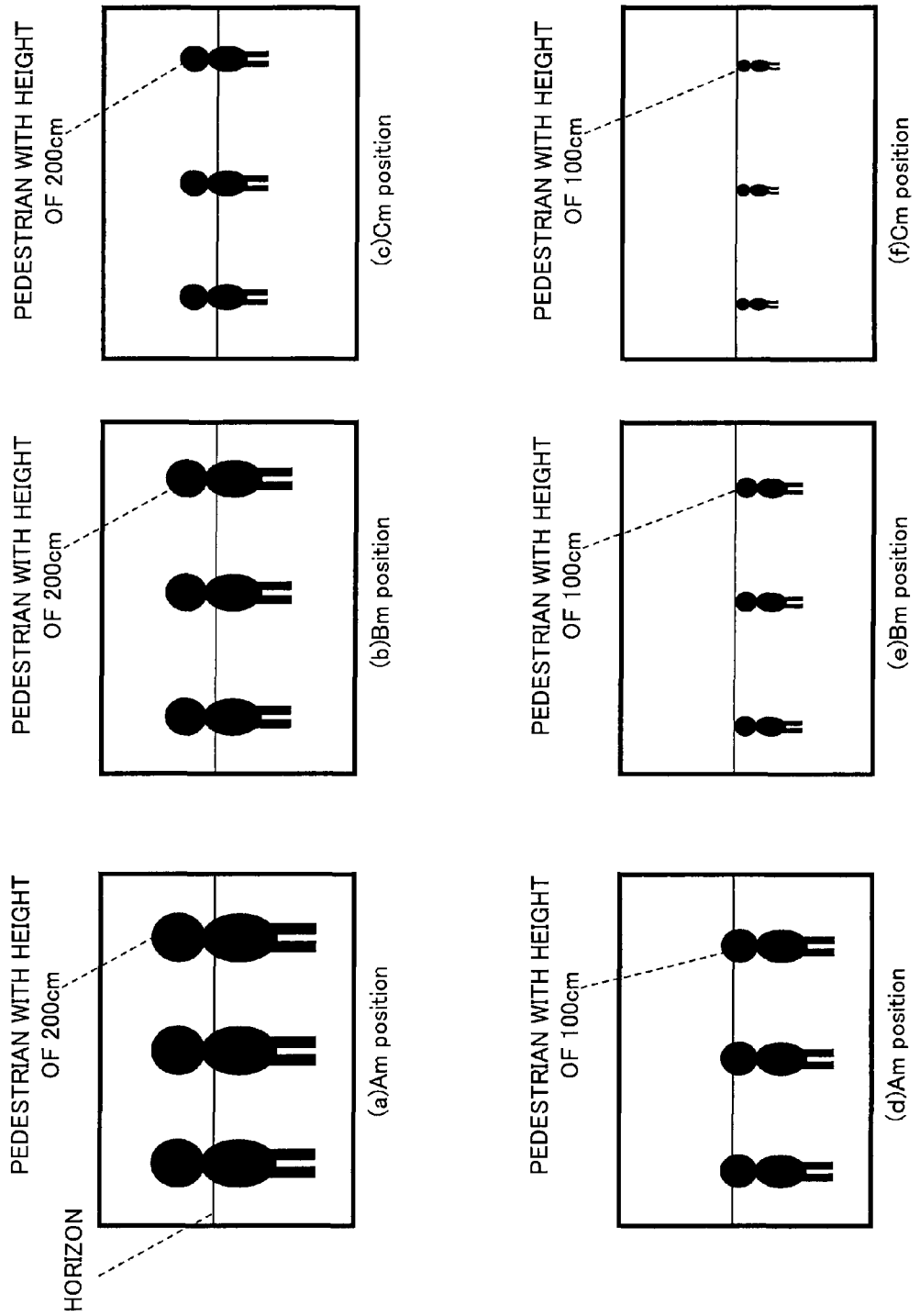
FIG. 2(a) is an explanatory diagram showing an example of a pedestrian with a height of 200 cm existing at a position at a distance of A m.
FIG. 2(b) is an explanatory diagram showing an example of a pedestrian with the height of 200 cm existing at a position at a distance of B m.
FIG. 2(c) is an explanatory diagram showing an example of a pedestrian with the height of 200 cm existing at a position at a distance of C m.
FIG. 2(d) is an explanatory diagram showing an example of a pedestrian with a height of 100 cm existing at the position at the distance of A m.
FIG. 2(e) is an explanatory diagram showing an example of a pedestrian with the height of 100 cm existing at the position at the distance of B m.
FIG. 2(f) is an explanatory diagram showing an example of a pedestrian with the height of 100 cm existing at the position at the distance of C m.
Figure 3:
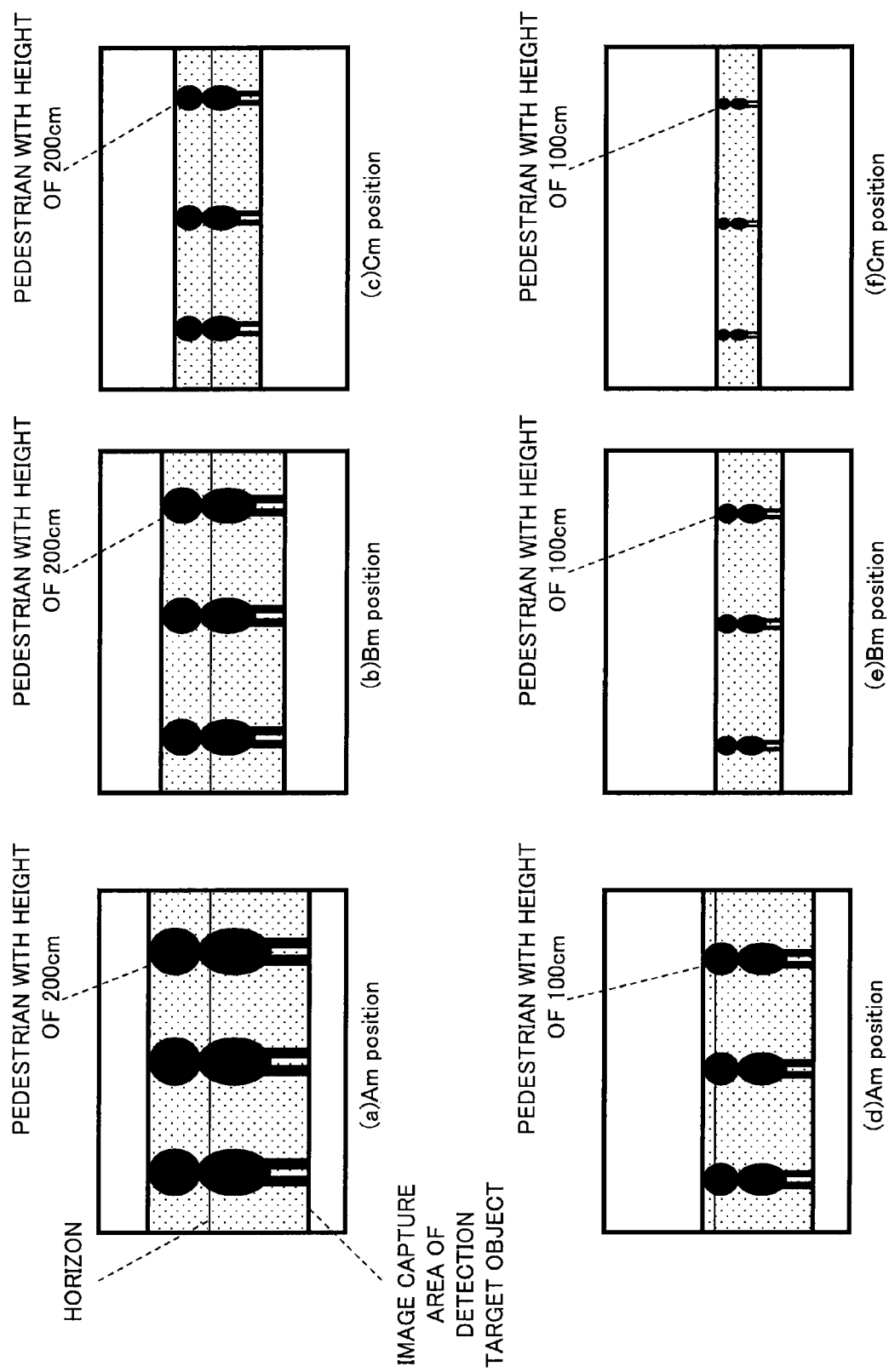
FIG. 3(a) is an explanatory diagram showing an image capture area when a pedestrian with the height of 200 cm exists at the position at the distance of A m.
FIG. 3(b) is an explanatory diagram showing an image capture area when a pedestrian with the height of 200 cm exists at the position at the distance of B m.
FIG. 3(c) is an explanatory diagram showing an image capture area when a pedestrian with the height of 200 cm exists at the position at the distance of C m.
FIG. 3(d) is an explanatory diagram showing an image capture area when a pedestrian with the height of 100 cm exists at the position at the distance of A m.
FIG. 3(e) is an explanatory diagram showing an image capture area when a pedestrian with the height of 100 cm exists at the position at the distance of B m.
FIG. 3(f) is an explanatory diagram showing an image capture area when a pedestrian with the height of 100 cm exists at the position at the distance of C m.
Figure 4:
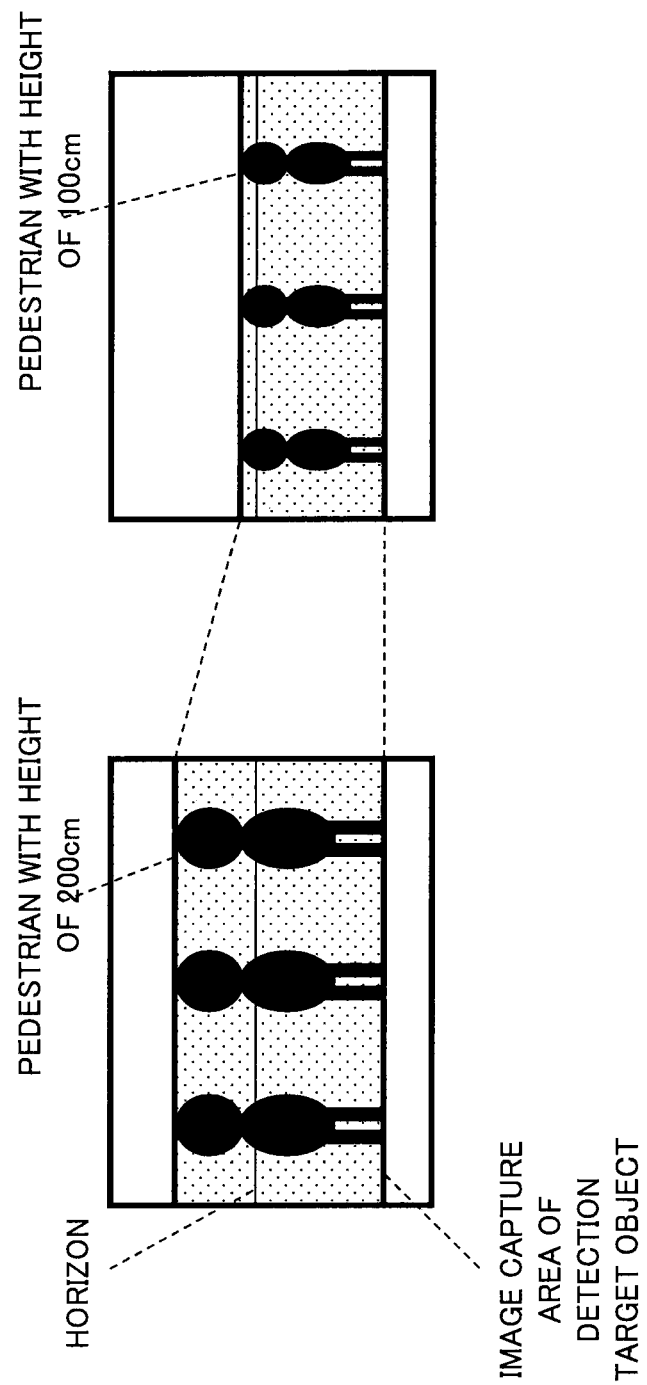
FIG. 4(a) is an explanatory diagram comparing image capture areas when pedestrians with heights of 200 cm and 100 cm, respectively, exist at the position at the distance of A m.
Figure 5:
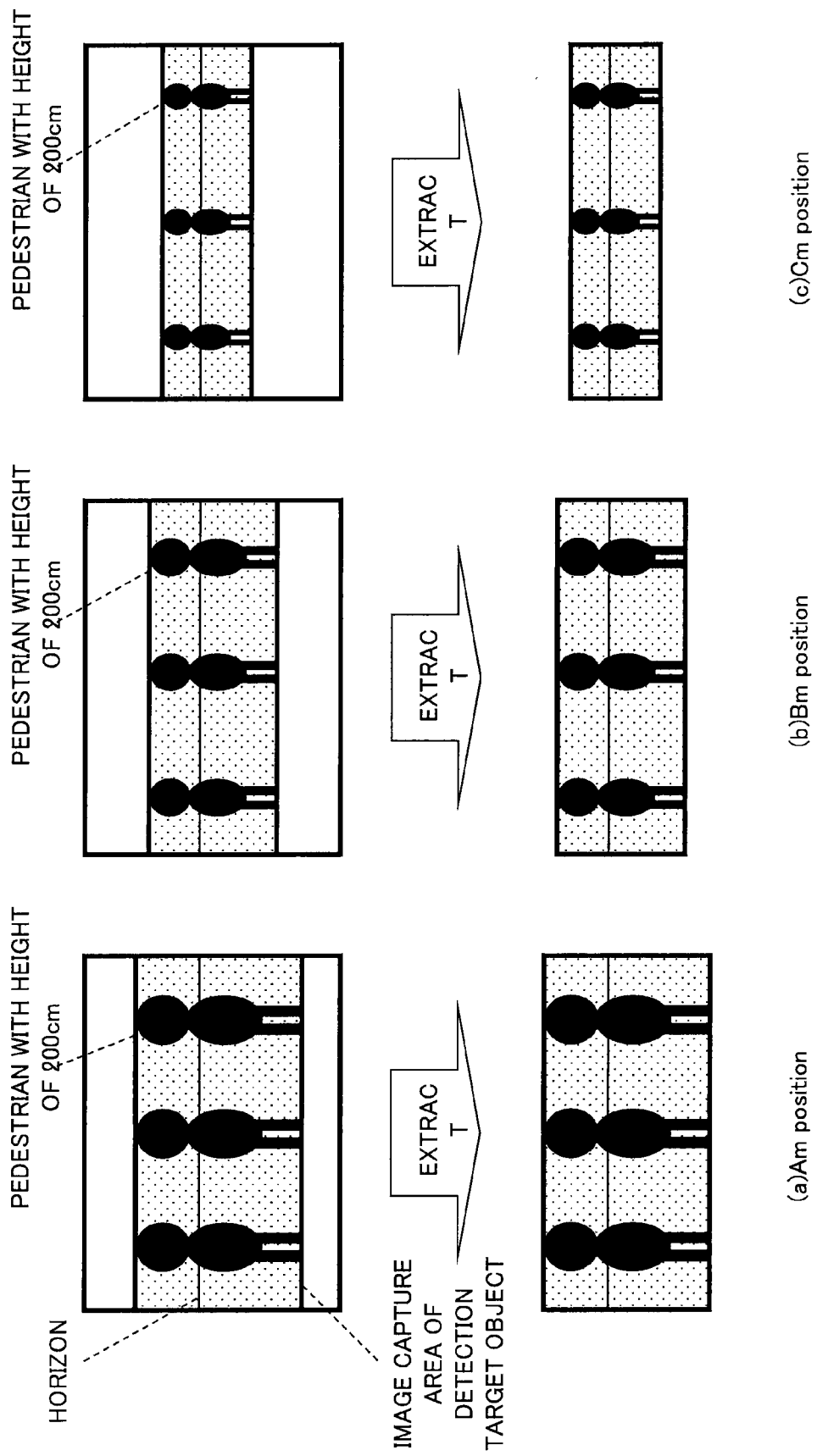
FIG. 5(a) is an explanatory diagram showing an example of an A m video image corresponding to the A m position.
FIG. 5(b) is an explanatory diagram showing an example of a B m video image corresponding to the B m position.
FIG. 5(c) is an explanatory diagram showing an example of a C m video image corresponding to the C m position.

The video images-classified-by-distance extracting section 31 generates video images classified by distance into which a video image has been extracted from an input image, according to distances from the vehicle. As described before, because the input video image is shot by the onboard camera installed on the vehicle, at a predetermined position and with a predetermined angle, an area in which an image of a pedestrian is captured on the input video image is uniquely determined by the distance between the vehicle and the pedestrian. FIG. 2 shows input video images in the case of pedestrians with a height of 200 cm and pedestrians with a height of 100 cm existing at positions at the distances of A meters, B meters and C meters (hereinafter referred to as A m, B m and C m) from the vehicle. As for the magnitude relationship between A, B and C, it is assumed that A<B<C is satisfied. The position at the distance of A m is nearest to the vehicle, and the position at the distance of C m is the farthest from the vehicle. FIGS. 2(a), 2(b) and 2(c) show that pedestrian with the height of 200 cm exist at the position at the distance of A m, at the position at the distance of B m and at the position at the distance of C m, respectively. FIGS. 2(d), 2(e) and 2(f) show that pedestrian with the height of 100 cm exist at the position at the distance of A m, at the position at the distance of B m and at the position at the distance of C m, respectively. FIG. 3 shows an area where detection target pedestrians are captured on each of video images classified by distance when the input video images are as those in FIG. 2. FIGS. 3(a) to 3(f) correspond to FIGS. 2(a) to 2(f), respectively. Considering that the pedestrians exist on the road surface, the positions of the feet of the pedestrians are the same irrespective of the heights of the pedestrians if the distances between the vehicle and the pedestrians are the same. Therefore, if there are pedestrians with the height of 100 cm and pedestrians with the height of 200 cm at the position at the distance of A m, areas in which the former and the latter are captured on video images are as shown in FIG. 4. The area in which the pedestrians with the height of 200 cm are shot includes the area in which the pedestrians with the height of 100 cm are shot. From the above, when pedestrians with heights of 100 to 200 cm exist at the positions at the distances of A m, B m and C m from the vehicle, video images classified by distance, for A m, B m and C m are as in FIGS. 5(a) to 5(c), respectively.

Figure 6:
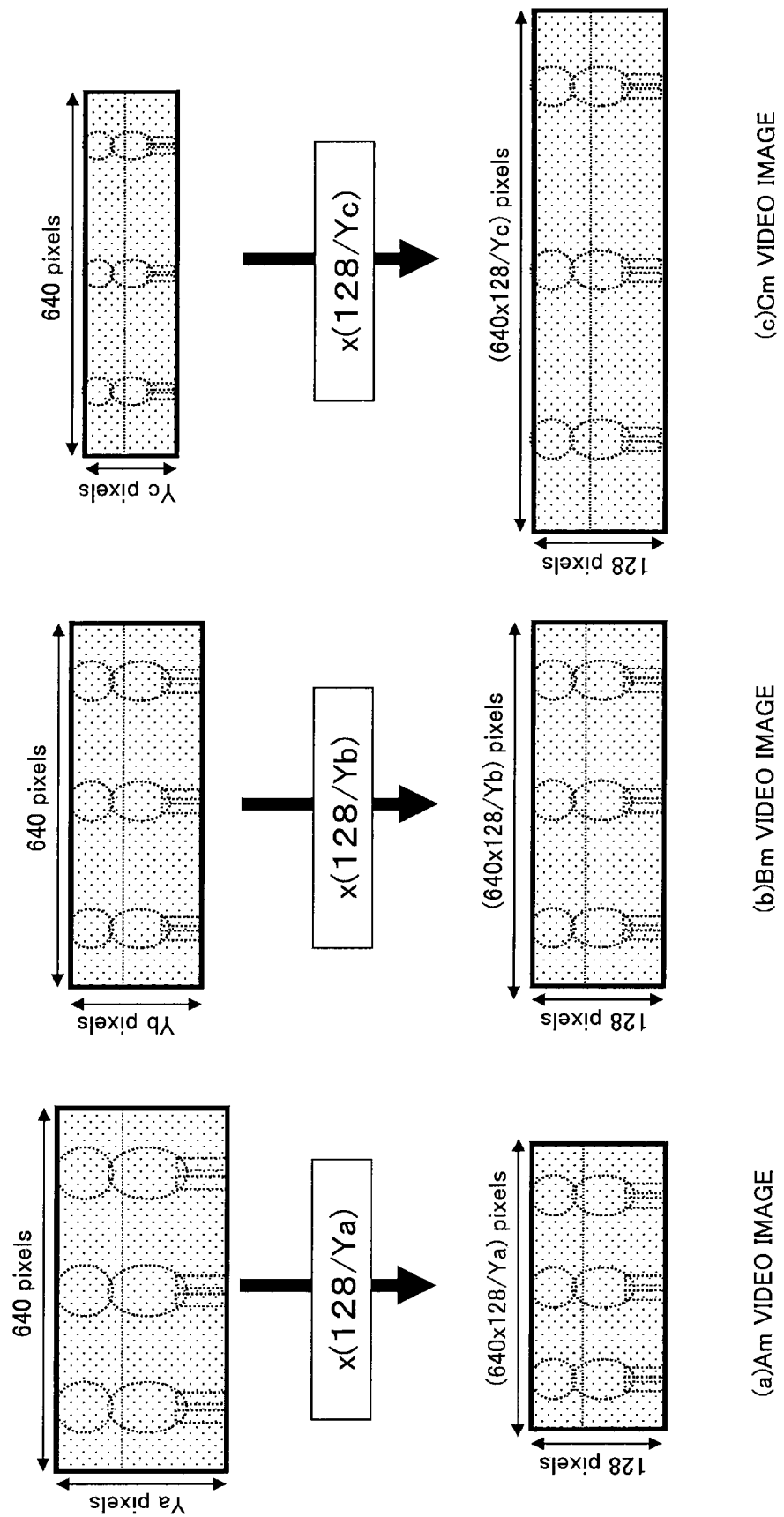
FIG. 6(a) is an explanatory diagram showing an example of the A m video image before and after enlargement/reduction.
FIG. 6(b) is an explanatory diagram showing an example of the B m video image before and after enlargement/reduction.
FIG. 6(c) is an explanatory diagram showing an example of the C m video image before and after enlargement/reduction.

The video images-classified-by-distance enlarging/reducing section 32 enlarges/reduces each of the video images classified by distance extracted by the video images-classified-by-distance extracting section 31 and normalizes the vertical sizes of the video images classified by distance to 128 pixels. It is assumed that the aspect ratio of the video images classified by distance does not change before and after enlargement/reduction. FIG. 6 shows an example of enlargement/reduction processing of the video images classified by distance. FIGS. 6(a), 6(b) and 6(c) show a video image classified by distance corresponding to the distance A m (hereinafter referred to as an A m video image), a video image classified by distance corresponding to the distance B m (hereinafter referred to as a B m video image) and a video image classified by distance corresponding to the distance C m (hereinafter referred to as a C m video image), respectively, before and after enlargement/reduction. The horizontal sizes of the video images classified by distance before enlargement/reduction are equally 640 pixels. The vertical sizes of the A m video image, the B m video image and the C m video image are Ya pixels, Yb pixels and Yc pixels, respectively. All of the vertical sizes of the video images classified by distance after enlargement/reduction are 128 pixels, and the vertical sizes of the A m video image, the B m video image and the C m video image are (640×120/Ya) pixels, (640×128/Yb) pixels and (640×128/Yc) pixels, respectively. At this time, if pedestrians with the same height are shot, the sizes of the pedestrians are equal in video images classified by distance after enlargement/reduction, irrespective of the distance from the vehicle.

Figure 7:
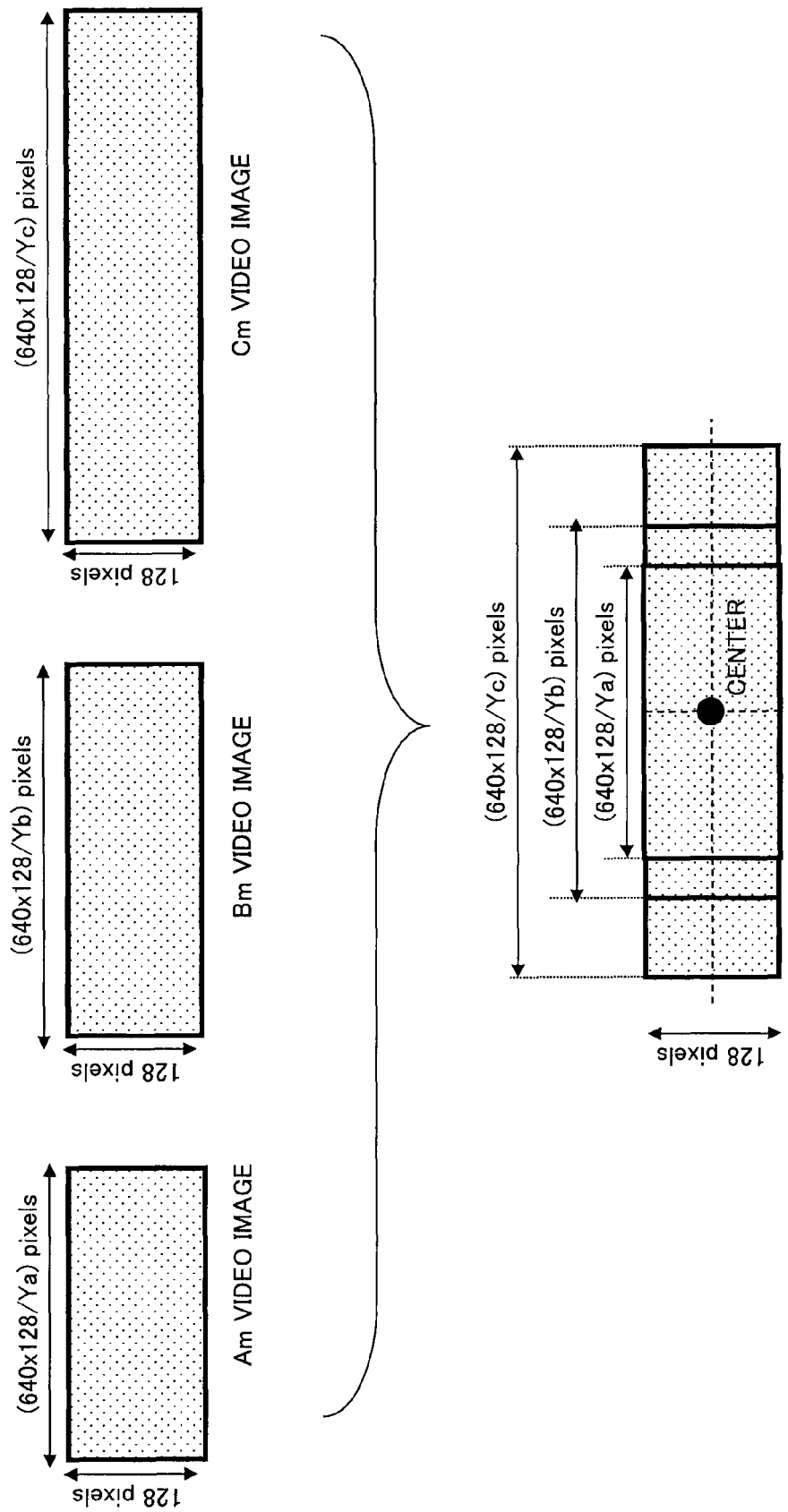
FIG. 7 is an explanatory diagram showing an example of position adjustment of the centers of video images classified by distance.
Figure 8:
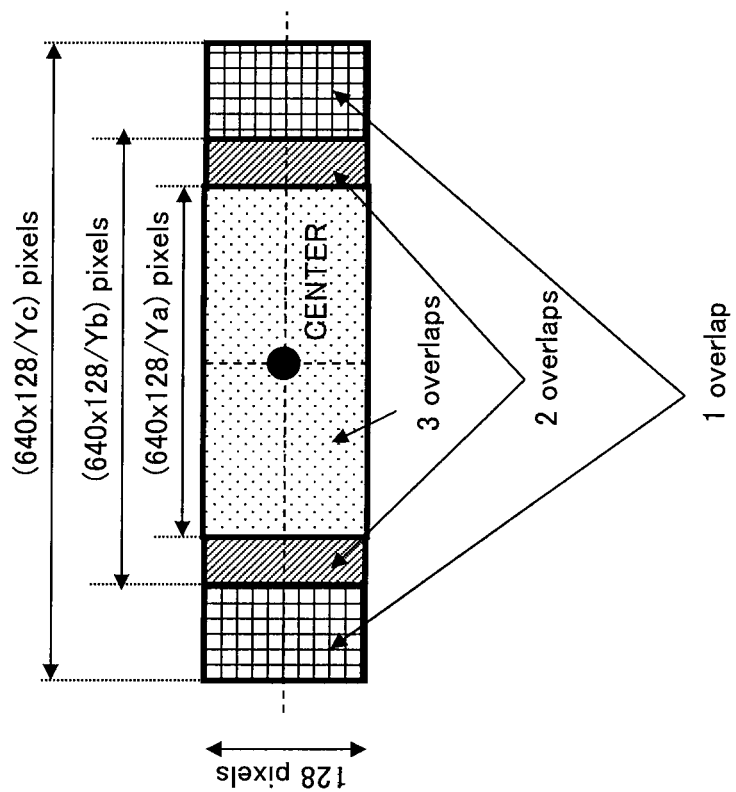
FIG. 8 is an explanatory diagram showing an example of the number of overlapped video images classified by distance.

The center position adjusting section 33 adjusts the center positions of the video images classified by distance the vertical sizes of which have been normalized to 128 pixels by the video images-classified-by-distance enlarging/reducing section 32, so that the center positions correspond to one another. FIG. 7 shows an example of adjusting the three center positions of the A m video image, B m video image and C m video image as video images classified by distance, so that the center positions correspond to one another. As shown in FIG. 7, when the center positions of the video images classified by distance are adjusted so that the center positions correspond to one another, the number of overlapped video images classified by distance differs on each part because, though the vertical sizes of the video images classified by distance are normalized to be 128 pixels, the horizontal sizes are different from one another. FIG. 8 illustrates the number of overlapped video images classified by distance in the example in FIG. 7. The number gradually decreases from the center position, from three to two and then one. The number of overlaps is the number of composed video images.

The number-of-characteristics-of-video images-classified-by-distance judging section 34 counts how many image characteristics exist on each video image classified by distance outputted from the video images-classified-by-distance enlarging/reducing section 32. In this embodiment, edge characteristics are used as the image characteristics. Though there are various means for counting the number of edges, the means is not limited in the present invention. For example, the number of pixels on which edges exist or the size of edges on pixels where the edges exist may be simply used. Otherwise, if it is known in advance that a detection target object has a lot of edges in a particular direction, means for counting only the edges in the particular direction as targets is effective. It is assumed here that the amount of image characteristics included in the A m video image classified by distance is referred to as Ea; the amount of image characteristics included in the B m video image classified by distance is referred to as Eb; and the amount of image characteristics included in the C m video image classified by distance is referred to as Ec. Though edge characteristics are targeted in this embodiment, other image characteristics can be targeted. For example, it is also possible to judge existence or nonexistence of a particular color. Processing for judging existence or nonexistence of brightness equal to a certain level or above is also possible. Furthermore, as illustrated in FIG. 6, since the video image sizes of the video images classified by distance outputted from the video images-classified-by-distance enlarging/reducing section are different from one another, the amount of image characteristics existing in the video image may be normalized on the basis of the video image size.

Figure 9:
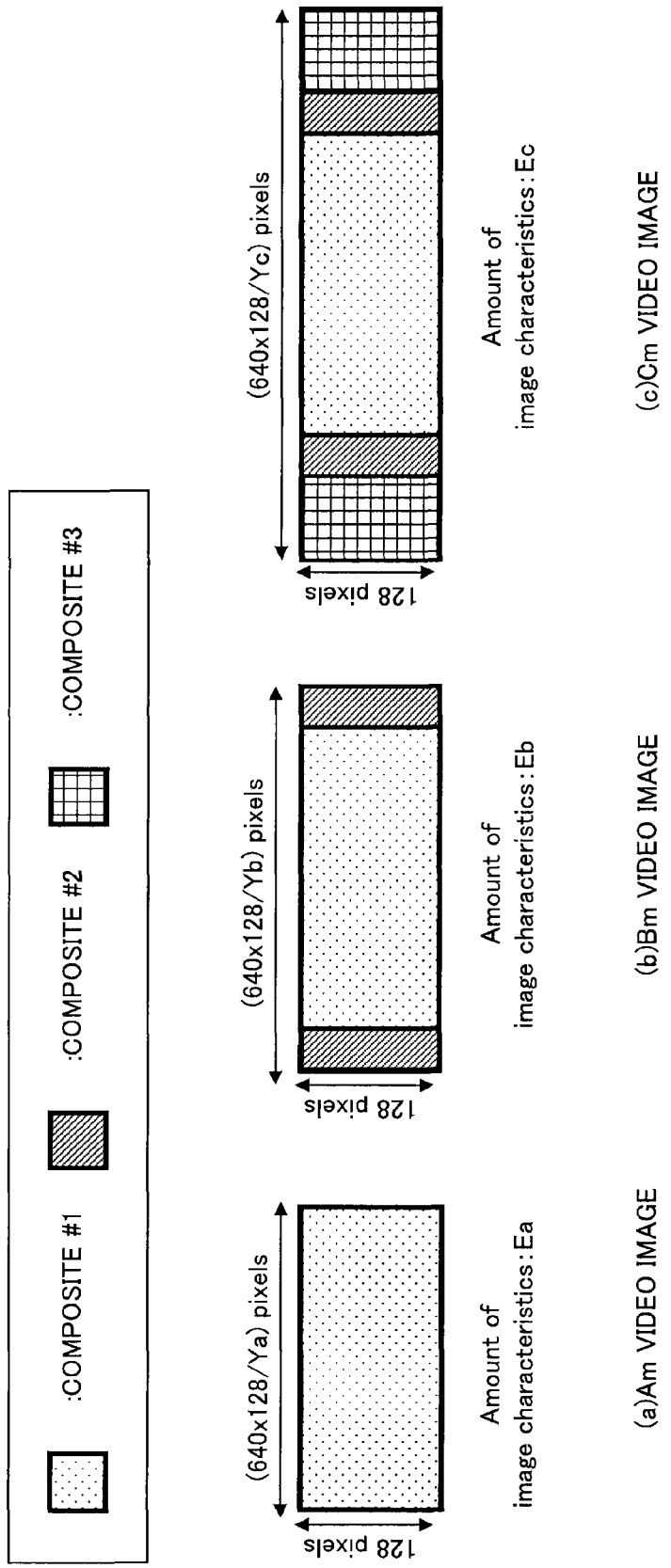
FIG. 9(a) is a diagram showing an example of the number of composed video images and the amount of image characteristics, for the A m video image.
FIG. 9(b) is a diagram showing an example of the number of composed video images and the amount of image characteristics, for the B m video image.
FIG. 9(c) is a diagram showing an example of the number of composed video images and the amount of image characteristics, for the C m video image.

The composite coefficient adjusting section 35 calculates composite coefficients of the video images classified by distance on the basis of the numbers of composed video images classified by distance determined by the center position adjusting section 33 and the amount of image characteristics Ea, Eb and Ec of the video images classified by distance, determined by the number-of-characteristics-of-video images-classified-by-distance judging section 34. Correspondence between the number of composed video images and the amount of image characteristics, for the video images classified by distance for the distances A m, B m and Cm, are shown in FIGS. 9(a) to 9(c), respectively. A method for calculating a composite coefficient in the case where there is such correspondence will be described with reference to FIG. 10. FIGS. 10(a) to 10(c) show composite coefficients to be set for the video images classified by distance for the distances A m, B m and C m, respectively. For the A m video image, one kind of composite coefficient Ma1 is set. For the B m video image, two kinds of composite coefficients Mb1 and Mb2 are set. For the C m video image, three kinds of composite coefficients Mc1 to Mc3 are set. Among these, Ma1, Mb1 and Mc1 are composite coefficients for parts where three video images, the A m video image, the B m video image and the C m video image are composed, and Mb2 and Mc2 are composite coefficients for parts where two video images, the B m video image and the C m video image are composed. Mc3 is a composite coefficient for one video image, the C m video image. The basic way of thinking the composite coefficient is that composite coefficients are equally allocated to video images classified by distance targeted by composite, according to the numbers of composed video images. That is, as for a part where three video images are composed, the composite coefficient of each video image classified by distance is made ⅓ so that the total is 1, and, as for a part where two video images are composed, the composite coefficient of each video image classified by distance is made ½ so that the total is 1. In this embodiment, for parts where multiple video images classified by distance are composed, the amount of image characteristics Ea to Ec corresponding to the video images classified by distance are used to adjust the composite coefficient, on the above idea of a total coefficient. The way of thinking of adjustment on the basis of the amount of image characteristics is such that a large composite coefficient is set for a video image classified by distance in which a lot of image characteristics exist, and that a small composite coefficient is set for a video image classified by distance with few image characteristics. On the basis of this idea, the composite coefficients Ma1, Mb1, Mb2, Mc1, Mc2 and Mc3 can be determined by the following formulas, respectively:

$$Ma1 = \left(\frac{Ea}{Ea+Eb+Ec}\right) \quad \text{[Formula 1]}$$

$$Mb1 = \left(\frac{Eb}{Ea+Eb+Ec}\right) \quad \text{[Formula 2]}$$

-continued $$Mb2 = \left(\frac{Eb}{Eb+Ec}\right) \quad \text{[Formula 3]}$$

$$Mc1 = \left(\frac{Ec}{Ea+Eb+Ec}\right) \quad \text{[Formula 4]}$$

$$Mc2 = \left(\frac{Ec}{Eb+Ec}\right) \quad \text{[Formula 5]}$$

$$Mc3 = \left(\frac{Ec}{Ec}\right) = 1 \quad \text{[Formula 6]}$$

Any calculation method is possible if the sum total of composite coefficients is 1, without being limited to the above calculation formulas.

The video images-classified-by-distance composing section 36 composes the video images classified by distance for which position adjustment has been performed by the center position adjusting section 33, using the composite coefficients determined by the composite coefficient adjusting section 35 to generate one composite video image. General α blending is used as image composite processing using composite coefficients. FIG. 11 is a diagram showing a specific example of video image composite. FIG. 11(*a*) shows an example of an input video image, in which four pedestrians exist. To describe the four pedestrians, two pedestrians with heights of 200 cm and 100 cm, respectively, exist side by side at a distance of A m from a vehicle on the left part of the input video image; one pedestrian with the height of 200 cm exists at a distance of B m from the vehicle in the central part of the input video image; and one pedestrian with the height of 200 cm at a distance of C m from the vehicle on the right part of the input video image. FIGS. 11(*b*), 11(*c*) and 11(*d*) show an A m video image, a B m video image and a C m video image, respectively, and FIG. 11(*e*) shows an example of a result of normalizing the sizes of the three video images classified by distance and composing them.

Next, the first object detecting section 40 will be described.

Figure 12:
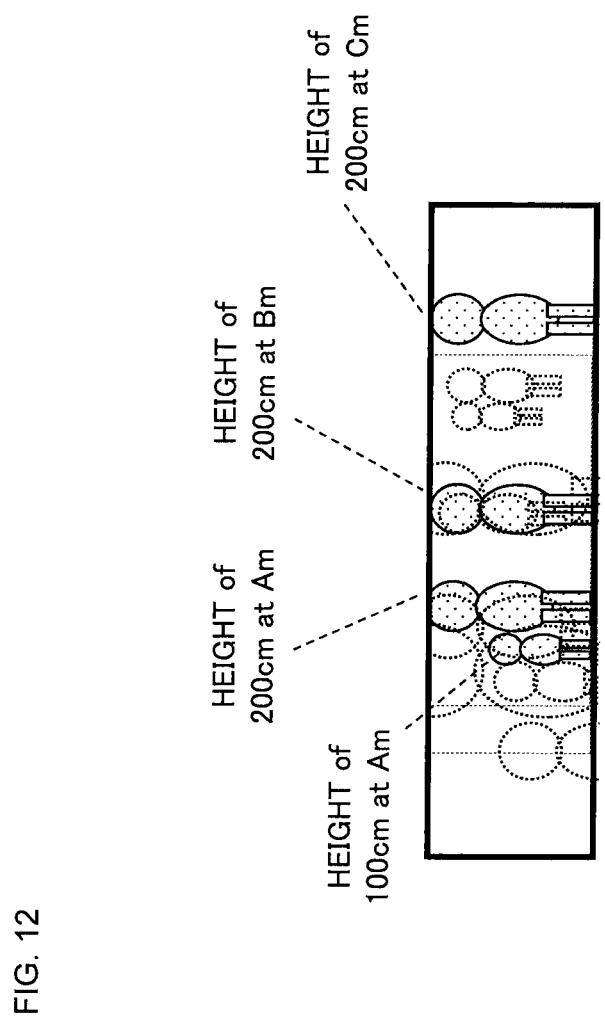
FIG. 12 is an explanatory diagram showing an example of pedestrians correctly normalized on the composite video image.

The composite video image cutting out/enlarging section 41 cuts out a part of the composite image outputted from the video images-classified-by-distance composing section 36 and enlarges the part to a predetermined size. Here, the purpose of cutting out a composite image is to cope with difference in size among detection target objects. For example, the cutout is for detecting both of the pedestrians with the height of 100 cm and the pedestrians with the height of 200 cm in FIG. 11. Here, FIG. 12 shows a diagram into which only four pedestrians whose sizes are correctly normalized correspondingly to the distances from the vehicle, in the composite video image in FIG. 11(*e*), have been extracted. At this time, though the positions of all the pedestrians' feet correspond to one another irrespective of their heights, the positions of their heads differ according to their heights. The sizes are the same if their heights are the same, irrespective of the distances from the vehicle. In subsequent-stage object detection processing, it is required that the vertical size of pedestrians should be about 128 pixels because of setting of a scanning frame, and, in the above state, pedestrians with the height of 100 cm cannot be detected. Therefore, a composite video image is cut out and enlarged to cope with this. In enlargement processing, the cut-out video image is enlarged with the aspect ratio of the video image maintained in a manner that the vertical size of the cut-out video image becomes 128 pixels which is the vertical size of a composite video image before the cutout. FIG. 13 shows an example of cutout and enlargement with the height of 100 cm as a target. FIG. 13(*a*) is a diagram showing a cutout area, and FIG. 13(*b*) shows a diagram in which a cut-out video image is enlarged. An example of cutout/enlargement for the height of 100 cm has been shown here. For other heights also, the cutout/enlargement processing is performed as much as necessary. At this time, since the feet of pedestrians necessarily exist at the bottom end of the composite video image irrespective of their heights, it is characteristic that a cutout position is necessarily in contact with the bottom end of the composite video image. In the case of not performing cutout and enlargement, detection corresponds to detection of the height of 200 cm. Since there is generally a margin for the size covered by the object detection processing, the cutout/enlargement processing can be performed for a detection-target height appropriately.

Figure 14:
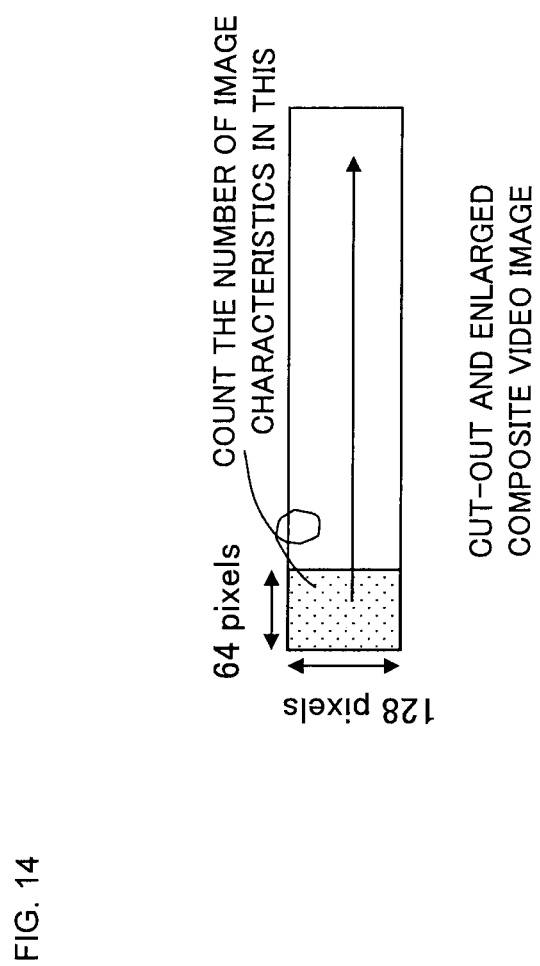
FIG. 14 is a diagram showing an example of scanning for counting the amount of image characteristics on the composite video image.

Next, the number-of-characteristics-of-composite-video image judging section 42 will be described with reference to FIG. 14. In judgment processing performed here, the amount of image characteristics which exist within a scanning frame (horizontal 64 pixels and vertical 128 pixels) of the object detection processing is counted on the composite image cut out and enlarged by the composite video image cutting out/enlarging section 41. Since edge characteristics are targeted in this embodiment, and a method for counting edges is similar to that of the number-of-characteristics-of-video images-classified-by-distance judging section 34, description thereof is omitted.

The object-in-composite-video image detecting section 43 performs the object detection processing for the composite video image. Since the vertical size of the composite video image and the vertical size of the scanning frame of the object detection processing correspond to each other, the object detection processing is processing in which scanning is performed once in a horizontal direction on the composite video image to judge whether a detection target object exists or not in the scanning. At this time, the detection processing is not performed at all scanning positions in the scanning, but it is judged whether or not to perform the detection processing, using a result of the number-of-characteristics-of-composite-video image judging section 42. That is, if image characteristics do not exist in the scanning frame, an object cannot exist, and, therefore, scanning is advanced without performing the detection processing. Thereby, the whole detection processing is sped up. As for the judgment whether image characteristics exist or not, a threshold is set appropriately, and the detection processing is performed only when a predetermined amount of image characteristics or more exist.

In the object detection processing in this embodiment, an object detection method based on edge characteristics is used. As the method using edge characteristics, a method utilizing HOG characteristics in which the strength and direction of edges are used is common, and the method is applicable to the present invention also. Not only the method utilizing the HOG characteristics but also any object detection method using edge characteristics is applicable. In the present invention, characteristics other than edge characteristics are also applicable as image characteristics.

Figure 15:
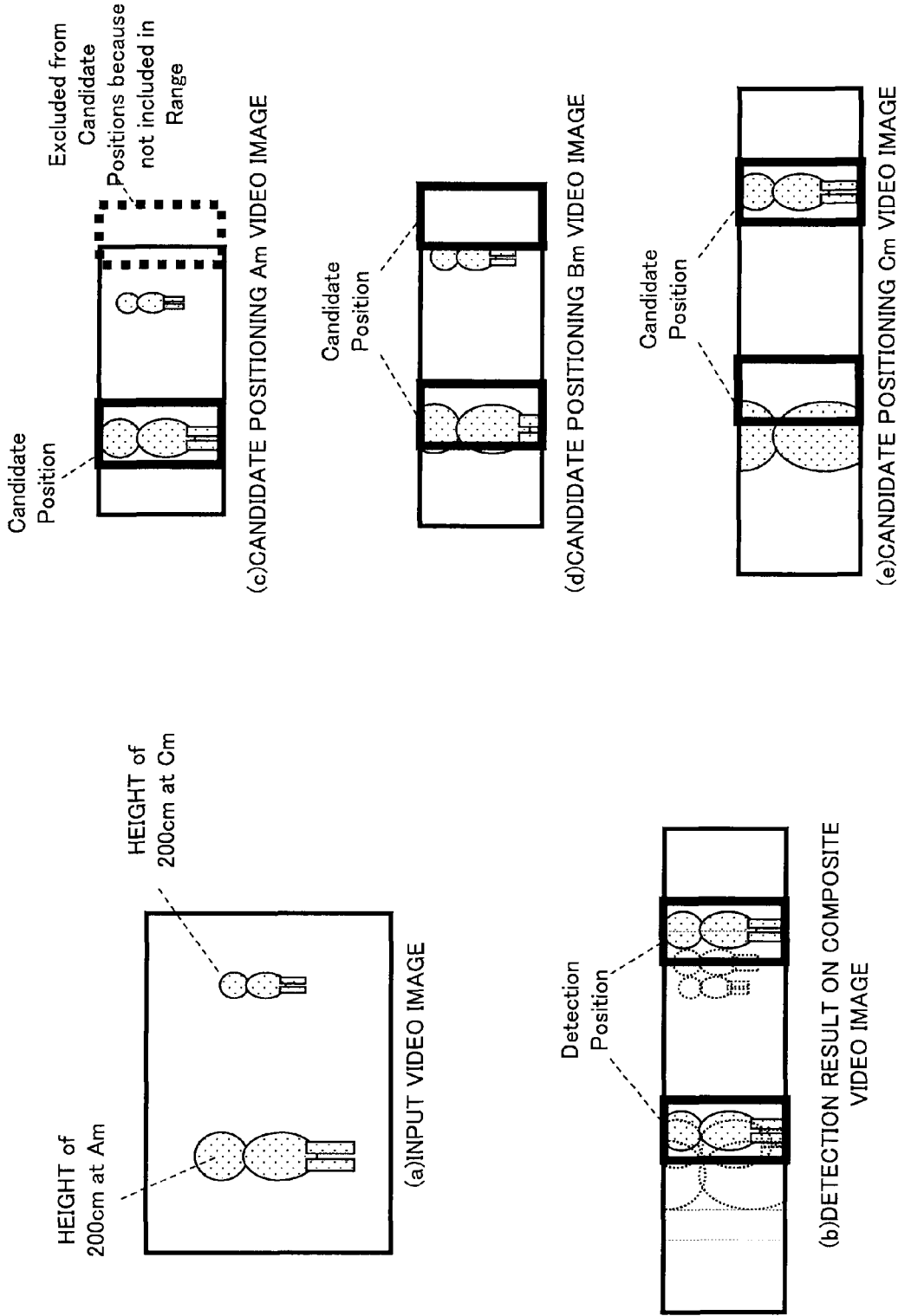
FIG. 15(a) is an explanatory diagram showing an example of an input video image.
FIG. 15(b) is an explanatory diagram showing an example of a detection result obtained by performing first object detection processing on the composite video image.
FIG. 15(c) is an explanatory diagram showing an example of specifying an object-candidate position on the A m video image.
FIG. 15(d) is an explanatory diagram showing an example of specifying an object-candidate position on the B m video image.
FIG. 15(e) is an explanatory diagram showing an example of specifying an object-candidate position on the C m video image.

Next, the object-candidate position specifying section 50 will be described with reference to FIG. 15. FIG. 15(*a*) shows an input video image; FIG. 15(*b*) shows a detection result of performing the first object detection processing on a composite video image; FIG. 15(*c*) shows a result of specifying an object-candidate position on an A m video image which is output of the video images-classified-by-distance enlarging/reducing section 32, by the first object detection processing; FIG. 15(*d*) shows a result of specifying object-candidate positions on a B m video image; and FIG. 15(*e*) shows a result of specifying object-candidate positions on a C m video image.

The input video image here shows that one pedestrian with the height of 200 cm exists at each of positions at a distance of A m and a distance of C m, and the two pedestrians are detected as a detection result on a composite video image. At this time, the composite video image is obtained by composing three video images, an A m video image, a B m video image and a C m video image. Therefore, when one detection result exists on the composite video image, one object-candidate position can be specified on each of the A m video image, the B m video image and the C m video image. Because the center position of the composite video image corresponds to the center position of each video image classified by distance, the candidate positions on the video images classified by distance can be specified on the same coordinates from the detected position on the composite image. However, the composite video image is not necessarily composed of three video images in all areas, and it is partially generated by two video images or one video image. Therefore, depending on the position of a detection result on the composite video image, it is not necessarily possible to specify an object-candidate position on all the video images classified by distance. In the example shown in FIG. 15, one object-candidate position is specified on the A m video image, and two object-candidate positions are specified on the B m and C m video images classified by distance.

Figure 16:
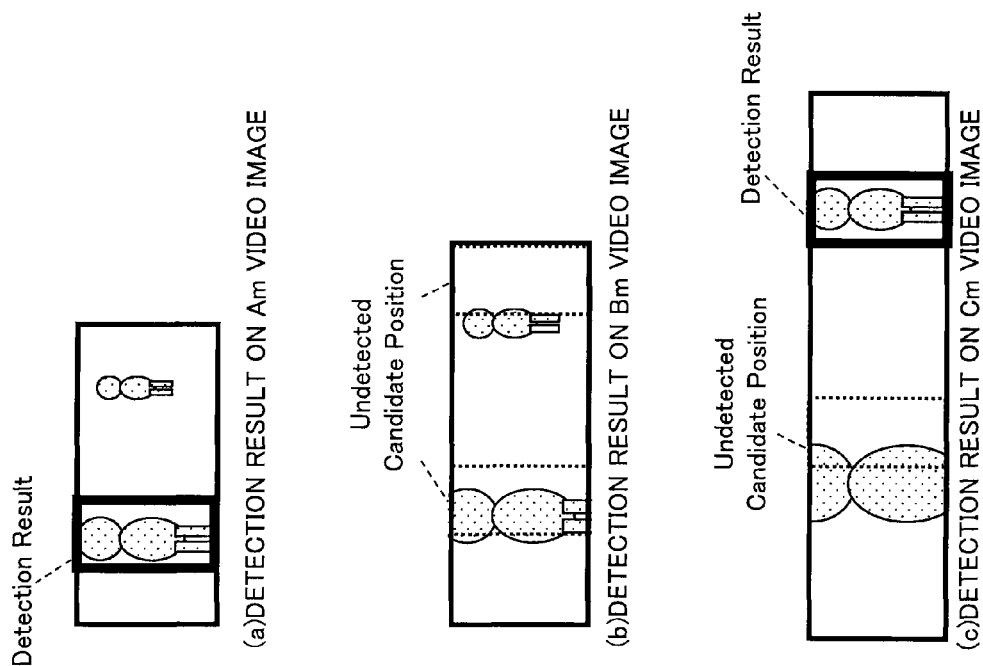
FIG. 16(a) is an explanatory diagram showing an example of an object detection result on the A m video image.
FIG. 16(b) is an explanatory diagram showing an example of an object detection result on the B m video image.
FIG. 16(c) is an explanatory diagram showing an example of an object detection result on the C m video image.

The second object detecting section 60 performs the object detection processing for the object-candidate positions specified on each video image classified by distance by the candidate object-position specifying section 50, and identifies positions where an object exists, on the video image classified by distance. In the object detection processing here, scanning as performed by the object-in-composite-video image detecting section 43 is not required, and the object detection processing can be performed only for the candidate positions specified by the candidate object-position specifying section 50. FIG. 16 shows detection results of performing the object detection processing for the object-candidate positions specified in FIGS. 15(c) to 15(e). FIGS. 16(a), 16(b) and 16(c) show a detection result on the A m video image, a detection result on the B m video image and a detection result on the C m video image, respectively. One object is detected on each of the A m video image and the C m video image. That is, it is seen that one pedestrian exists at each of the distances of A m and C m from the vehicle. As for means for the object detection processing, an object detection method based on edge characteristics is used similarly to the object-in-composite-video image detecting section 43. The method to be used may be the same detection method as that of the object-in-composite-video image detecting section 43 or may be a different one. Furthermore, different object detection accuracies may be used by the object-in-composite-video image detecting section 43 and the second object detecting section 60. In this case, the detection accuracy is set more strict for the second object detecting section 60 than for the object-in-composite-video image detecting section 43. Since the amount of processing of the object-in-composite-video image detecting section 43 is larger in comparison with the second object detecting section 60, the object-in-composite-video image detecting section 43 performs simple object detection in which some degree of wrong detection is permitted. In the second object detection processing in which object candidates are limited and the amount of processing decreases, the wrong detection is excluded so that only detection target objects are certainly included into a detection result. Thereby, it is possible to realize speedup of the object detection processing without decreasing the detection accuracy.

Figure 17:
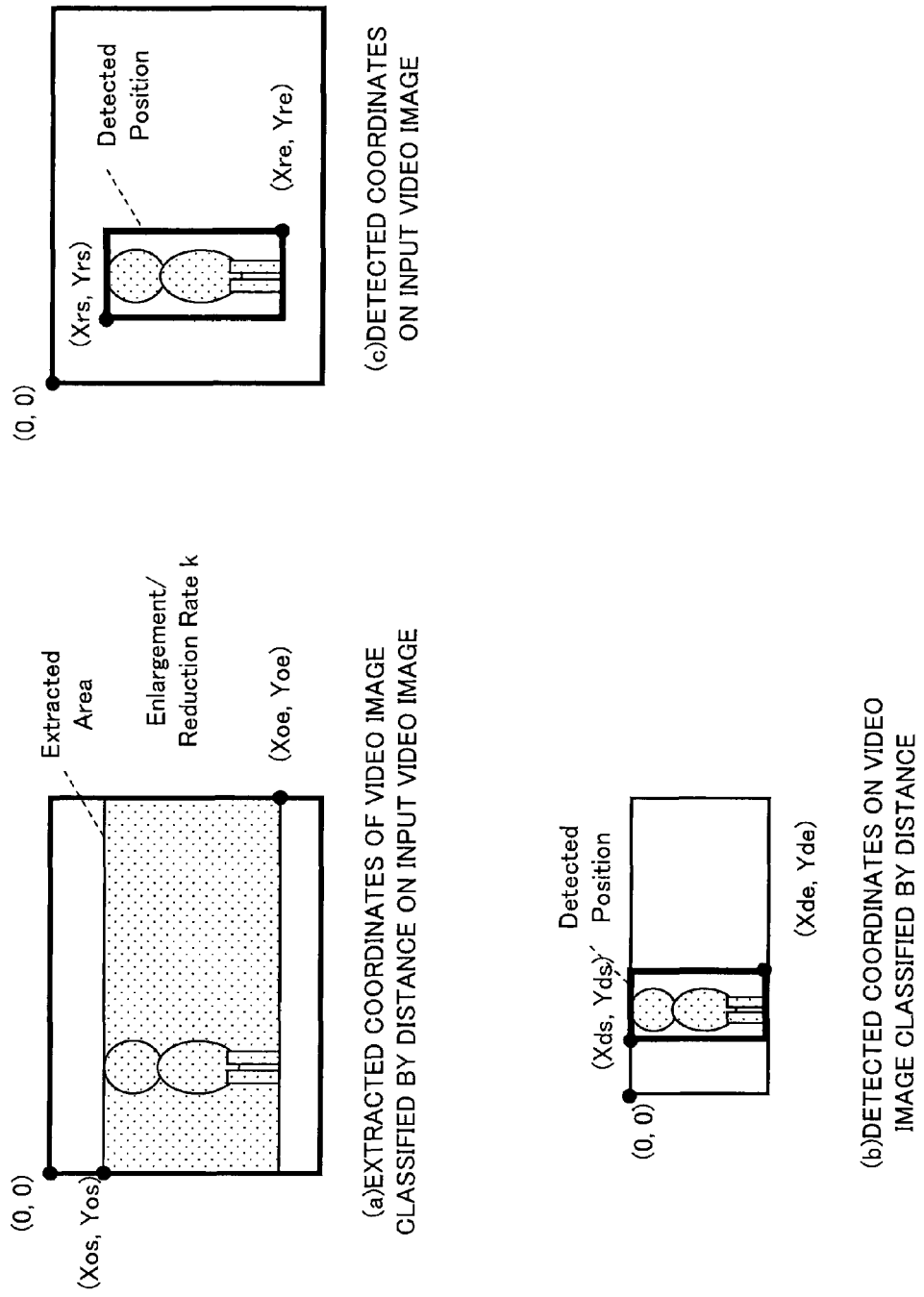
FIG. 17(a) is an explanatory diagram showing an example of extracted coordinates of a video image classified by distance on an input video image.
FIG. 17(b) is an explanatory diagram showing an example of detected coordinates on a video image classified by distance.
FIG. 17(c) is an explanatory diagram showing an example of detected coordinates on the input video image.

The object position identifying section 70 identifies an object position in the input video image on the basis of the object detection results on the video images classified by distance detected by the second object detecting section 60. The object position in the input video image can be easily determined from the extraction coordinates positions and enlargement/reduction rates at the time of generating the video images classified by distance by the video images-classified-by-distance extracting section 31 and the video images-classified-by-distance enlarging/reducing section 32. A procedure for determining position coordinates on the input video image from detected position coordinates on a video image classified by distance will be described with reference to FIG. 17. FIG. 17(a) shows coordinate positions for extracting a video image classified by distance from an input video image. The video image classified by distance corresponds to what is obtained by multiplying an area defined by upper left (Xos, Yos) and lower right (Xoe, Yoe), with the uppermost left of the input video image as the origin (0, 0), by an enlargement/reduction rate k. FIG. 17(b) shows coordinate positions identifying an object position on the extracted video image classified by distance. A range defined by upper left (Xds, Yds) and lower right (Xde, Yde), with the uppermost left of the video image classified by distance as the origin (0, 0), is a detected position. FIG. 17(c) shows a result of converting the coordinates of the object position identified on the video image classified by distance to coordinates on the input video image. A range defined by upper left (Xrs, Yrs) and lower right (Xre, Yre), with the uppermost left of the input video image as the origin (0, 0), is coordinates of a final object result detection. At this time, Xrs, Yrs, Xre and Yre can be determined by the following formulas 7 to 10 with the use of variables in FIGS. 17(a) and 17(b).

$$Xrs = \left(\frac{Xds}{K}\right) + Xos \qquad \text{[Formula 7]}$$

$$Yrs = \left(\frac{Yds}{K}\right) + Yos \qquad \text{[Formula 8]}$$

$$Xre = \left(\frac{Xde}{K}\right) + Xos \qquad \text{[Formula 9]}$$

$$Yre = \left(\frac{Yde}{K}\right) + Yos \qquad \text{[Formula 10]}$$

Thereby, the object position on the input video image can be identified. Not only is the object position identified but the distance from the vehicle to the object can be also identified because the object position is determined once on the video image classified by distance.

According to the object detection device according to the above embodiment, a video image in which surroundings of a vehicle is shot is converted to a characteristics video image, and first object detection processing is performed on a video image obtained by, on the basis of distances from the vehicle, extracting different areas from the characteristics video image according to the distances and composing them, to determine an object-candidate position. Furthermore, second object detection processing is performed for the object-candidate position to identify an object detection position. Thus, it is possible not only to speed up object detection processing without sacrificing object detection performance but also to measure the distance from the vehicle to the object.

A preferred embodiment of the present invention conceivable at present has been described above. However, various variations of this embodiment are possible, and it is intended that all such variations within the true spirit and scope of the present invention are included in the Claims.

The object detection method of the present invention can be a method which includes each step realized by the above object detection device. As for the object detection program of the present invention also, it is sufficient if the program causes a computer to realize each function realized by the above object detection device, and the program is not especially restricted.

Figure 18:
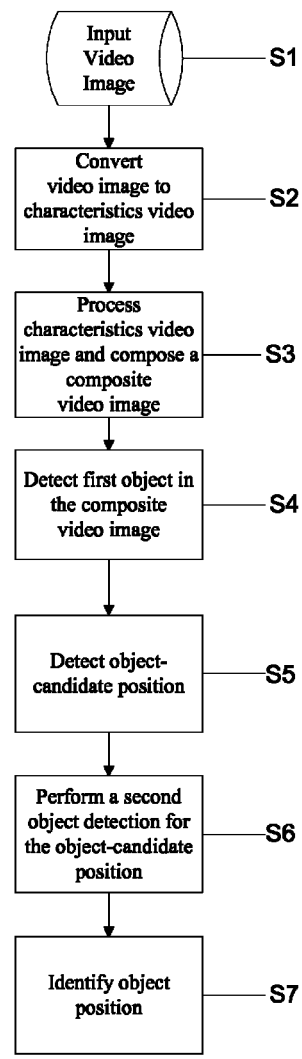
FIG. 18 is a flow diagram.

FIG. 18 is a flow diagram illustrating an object detection method for detecting an object near a vehicle from an input video image of surroundings of the vehicle shot from the vehicle. The method includes the following steps: In step S1, an input video image of the surroundings of the vehicle is shot from the vehicle. In step S2, the video image is converted to a characteristics video image into which image characteristics have been extracted from the input video image. In step S3, the video image is processed by extracting areas which differ according to distances from the characteristics video image as video images classified by distance, on the basis of the distance from the vehicle, and by composing a composite video image using the video images classified by distance. In step S4, a first object is detected by scanning the composite video image composed in step S3 to determine a position on the composite video image of an object detected from the composite video image. In step S5, an object-candidate position is detected by determining an object-candidate position where there is a possibility of existence of the object, in the video images classified by distance, on the basis of the position on the composite video image of the object detected in step S4. In step S6, a second object detection is performed, for the object-candidate position determined in step S5, second object detection processing for identifying corresponding object positions in the video images classified by distance. In step S7, an object position is identified by identifying the object position in the input video image on the basis of the object positions determined in step S6.

A preferred embodiment of the present invention conceivable at present has been described above. However, it is intended that it should be understood that various variations of this embodiment are possible, and that all such variations within the true spirit and scope of the present invention are included in the Claims.

INDUSTRIAL APPLICABILITY

As described above, the object detection device of the present invention converts a video image in which surroundings of a vehicle is shot to a characteristics video image, and performs first object detection processing on a video image obtained by, on the basis of distances from the vehicle, extracting different areas from the characteristics video image according to the distances and composing them, to determine an object-candidate position, and, furthermore, performs second object detection processing for the object-candidate position to identify an object detection position. Thus, the object detection device is excellently advantageous in that it is possible not only to speed up object detection processing without sacrificing object detection performance but also to measure the distance from the vehicle to the object, and it is useful as an object detection device and the like for detecting an object around a vehicle.

REFERENCE SIGNS LIST 10 object detection device
20 video image converting section
30 video images-classified-by-distance extracting/composing section
31 video images-classified-by-distance extracting section
32 video images-classified-by-distance enlarging/reducing section
33 center position adjusting section
34 number-of-characteristics-of-video images-classified-by-distance judging section
35 composite coefficient adjusting section
36 video images-classified-by-distance composing section
40 first object detecting section
41 composite video image cutting out/enlarging section
42 number-of-characteristics-of-composite-video image judging section
43 object-in-composite-video image detecting section
50 candidate object-position specifying section
60 second object detecting section
70 object position identifying section

The invention claimed is:

1. An object detection device detecting an object near a vehicle from an input video image, the input video image being a video image of surroundings of the vehicle shot from the vehicle, the device comprising:
   a video image converting section which converts the input video image to a characteristics video image in which image characteristics have been extracted from the input video image;
   a video image processing section which extracts areas which differ according to distances from the characteristics video image as video images classified by distance, on the basis of the distance from the vehicle, and composes a composite video image using the video images classified by distance, wherein the composite video image is a composite of said video images classified by distance;
   a first object detecting section which performs first object detection processing of scanning the composite video image composed by the video image processing section to determine a position on the composite video image of an object detected from the composite video image;
   an object-candidate position specifying section which determines an object-candidate position where there is a possibility of existence of the object, in the video images classified by distance, on the basis of the position on the composite video image of the object detected by the first object detecting section;
   a second object detecting section which performs, for the object-candidate position determined by the object-candidate position specifying section, second object detection processing for identifying corresponding object positions in the video images classified by distance; and
   an object position identifying section which identifies an object position in the input video image on the basis of the object positions determined by the second object detecting section.

2. The object detection device according to claim 1, wherein the video image converting section extracts edge characteristics as the image characteristics.

3. The object detection device according to claim 1, wherein the video image processing section changes the size of an area extracted from the characteristics video image on the basis of the distance from the vehicle.

4. The object detection device according to claim 1, wherein the video image processing section enlarges or reduces the video images according to distances so that the vertical sizes of all the video images classified by distance are equal to one another.

5. The object detection device according to claim 1, wherein the video image processing section adjusts the positions of the horizontal center axes and vertical center axes of the video images classified by distance so that they are overlapped, and composes the composite video image.

6. The object detection device according to claim 1, wherein the video image processing section composes the composite video image by distance by α blending.

7. The object detection device according to claim 1, wherein the video image processing section partially adjusts a composite coefficient of α blending and composes the composite video image, according to the number of composed video images classified by distance.

8. The object detection device according to claim 1, wherein the video image processing section adjusts the composite coefficient of α0 blending and composes the composite video image, according to the numbers of image characteristics included in the video images classified by distance.

9. The object detection device according to claim 1, wherein the first object detecting section sets the vertical size of a detection target object to be equal to the vertical size of the composite video image in the first object detection processing.

10. The object detection device according to claim 1, wherein the first object detecting section performs object detection processing by performing scanning on the composite video image only in a horizontal direction.

11. The object detection device according to claim 1, wherein the first object detecting section comprises a composite video image processing section cutting out an area in contact with the bottom end of the composite video image and generating an enlarged composite video image obtained by enlarging the vertical size of the cut-out area so that the vertical size is equal to the vertical size of the composite video image.

12. The object detection device according to claim 11, wherein the first object detecting section performs the object detection processing for the enlarged composite video image.

13. The object detection device according to claim 12, wherein the first object detecting section performs the object detection processing by performing scanning on the enlarged composite video image only in a horizontal direction.

14. The object detection device according to claim 1, wherein the first object detecting section is capable of adjusting a detection judgment criterion for object detection separately from the second object detecting section, and the detection criterion is adjusted so that the first object detecting section judges an object to be an object more easily than the second object detecting section.

15. The object detection device according to claim 1, wherein the first object detecting section performs the first object detection processing only on parts of the composite video image where the image characteristics exist as targets.

16. The object detection device according to claim 1, wherein the object position identifying section determines the distance from the vehicle to a detected object on the basis of the object positions on the video images classified by distance detected by the second object detecting section.

17. An object detection method for detecting an object near a vehicle from an input video image, the input video image being a video image of surroundings of the vehicle shot from the vehicle, the method comprising:

a video image converting step of converting the input video image to a characteristics video image into which image characteristics have been extracted from the input video image;

a video image processing step of extracting areas which differ according to distances from the characteristics video image as video images classified by distance, on the basis of the distance from the vehicle, and composing a composite video image using the video images classified by distance, wherein the composite video image is a composite of said video images classified by distance;

a first object detecting step of performing first object detection processing of scanning the composite video image composed in the image processing step to determine a position on the composite video image of an object detected from the composite video image;

an object-candidate position detecting step of determining an object-candidate position where there is a possibility of existence of the object, in the video images classified by distance, on the basis of the position on the composite video image of the object detected in the first object detecting step;

a second object detecting step of performing, for the object-candidate position determined in the object-candidate position detecting step, second object detection processing for identifying corresponding object positions in the video images classified by distance; and an object position identifying step of identifying an object position in the input video image on the basis of the object positions determined in the second object detecting step.

18. A non-transitory computer-readable medium storing an object detection program for detecting an object near a vehicle from an input video image, the input video image being a video image of surroundings of the vehicle shot from the vehicle, the program causing a computer to realize:

a video image converting function of converting the input video image to a characteristics video image into which image characteristics have been extracted from the input video image;

a video image processing function of extracting areas which differ according to distances from the characteristics video image as video images classified by distance, on the basis of the distance from the vehicle, and composing a composite video image using the video images classified by distance, wherein the composite video image is a composite of said video images classified by distance;

a first object detecting function of scanning the composite video image composed by the video image function to perform first object detection processing;

an object-candidate position detecting function of determining an object-candidate position where there is a possibility of existence of an object, in the video images classified by distance, on the basis of a position on the composite video image where an object has been detected by the first object detecting section;

a second object detecting function of performing second object detection processing for the object-candidate position determined by the object-candidate position detecting function to identify an object position in the video images classified by distance; and an object position identifying function of identifying an object position in the input video image on the basis of the object positions determined by the second object detecting function.

* * * * *